United States Patent [19]

Abe

[11] Patent Number: 5,450,600

[45] Date of Patent: Sep. 12, 1995

[54] INTEGRATED COMMAND RECOGNITION APPARATUS AND METHOD FOR SELECTING AN OPTIMAL COMMAND AMONG NUMEROUS COMMANDS

[75] Inventor: Kazuo Abe, Kanagawa, Japan

[73] Assignee: Mitsubishi Denki Kabushiki Kaisha, Tokyo, Japan

[21] Appl. No.: 967,414

[22] Filed: Oct. 28, 1992

[30] Foreign Application Priority Data

Nov. 8, 1991 [JP] Japan ................................. 3-292917
Feb. 19, 1992 [JP] Japan ................................. 4-031848

[51] Int. Cl.⁶ .............................................. G06F 3/00
[52] U.S. Cl. .................................. 395/800; 395/156; 395/157; 395/158; 395/159; 395/160; 364/286.2; 364/286.3; 364/DIG. 1
[58] Field of Search .................. 395/800, 600, 100, 12, 395/156, 157, 158, 159, 160; 364/DIG. 1, DIG. 2, 286.2, 286.3

[56] References Cited

U.S. PATENT DOCUMENTS

| | | | |
|---|---|---|---|
| 4,435,772 | 3/1984 | Suzuki et al. | 395/106 |
| 5,008,853 | 4/1991 | Bly et al. | 395/153 |
| 5,119,475 | 6/1992 | Smith et al. | 395/156 |
| 5,287,514 | 2/1994 | Gram | 395/700 |

FOREIGN PATENT DOCUMENTS 2231982 11/1990 United Kingdom .

OTHER PUBLICATIONS

Jan Van Den Bos "Abstract Interaction Tools: A Language for User Interface Management Systems" Apr., 1988.

*Primary Examiner*—Alyssa H. Bowler
*Assistant Examiner*—Dzung C. Nguyen
*Attorney, Agent, or Firm*—Wolf, Greenfield & Sacks

[57] ABSTRACT

An integrated command definition file defines both names of integrated commands and basic commands integrated. A basic command syntax file stores the basic commands and these parameter information. An integrated command registration utility has functions to convert the integrated command definition to an integrated command syntax file. And an interactive command management module recognizes both of basic commands memorized in the basic command syntax file and integrated commands memorized in the integrated command syntax file.

8 Claims, 47 Drawing Sheets

THE OPERATING ENVIRONMENT FOR THE INTEGRATED COMMAND

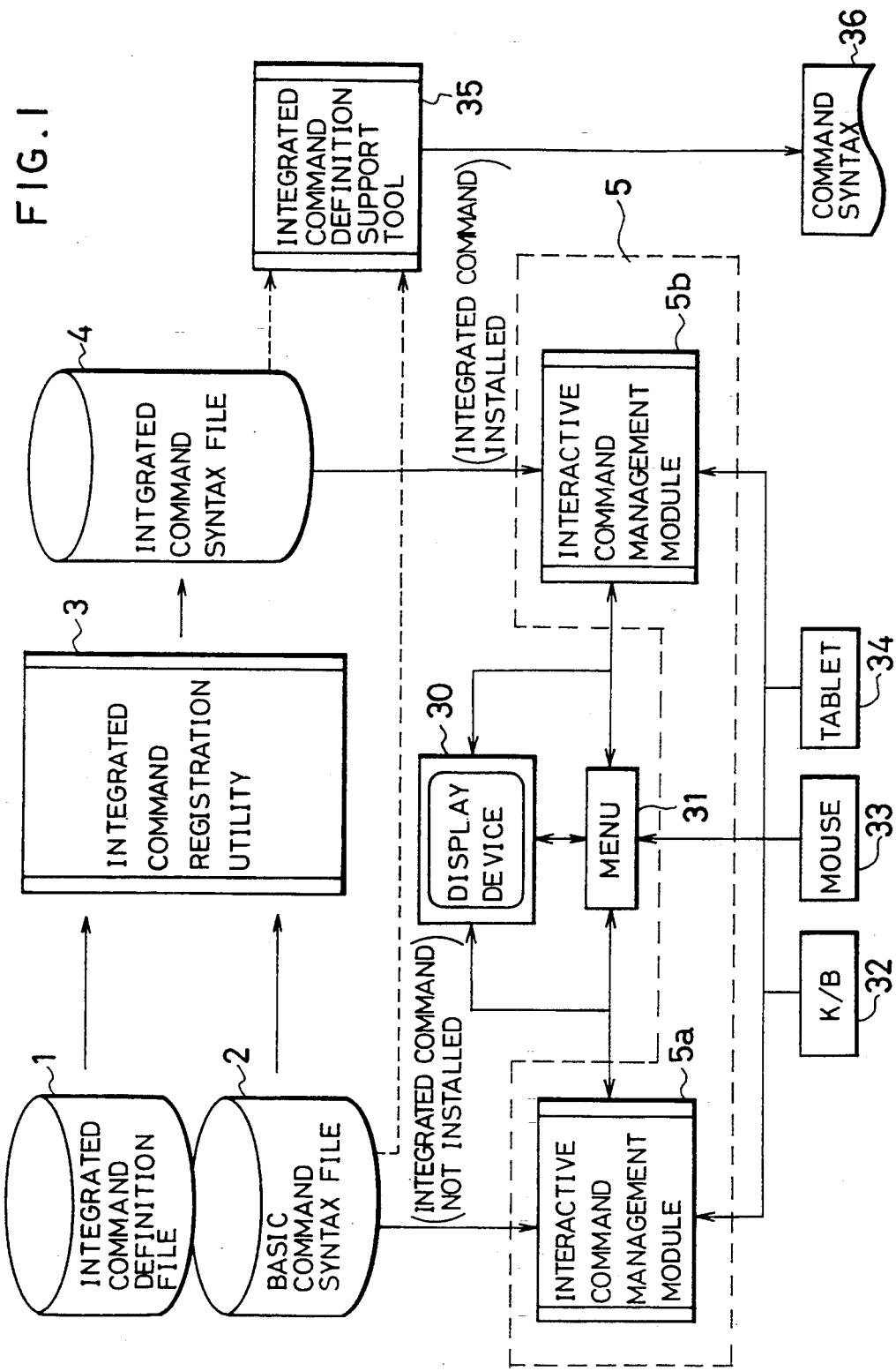

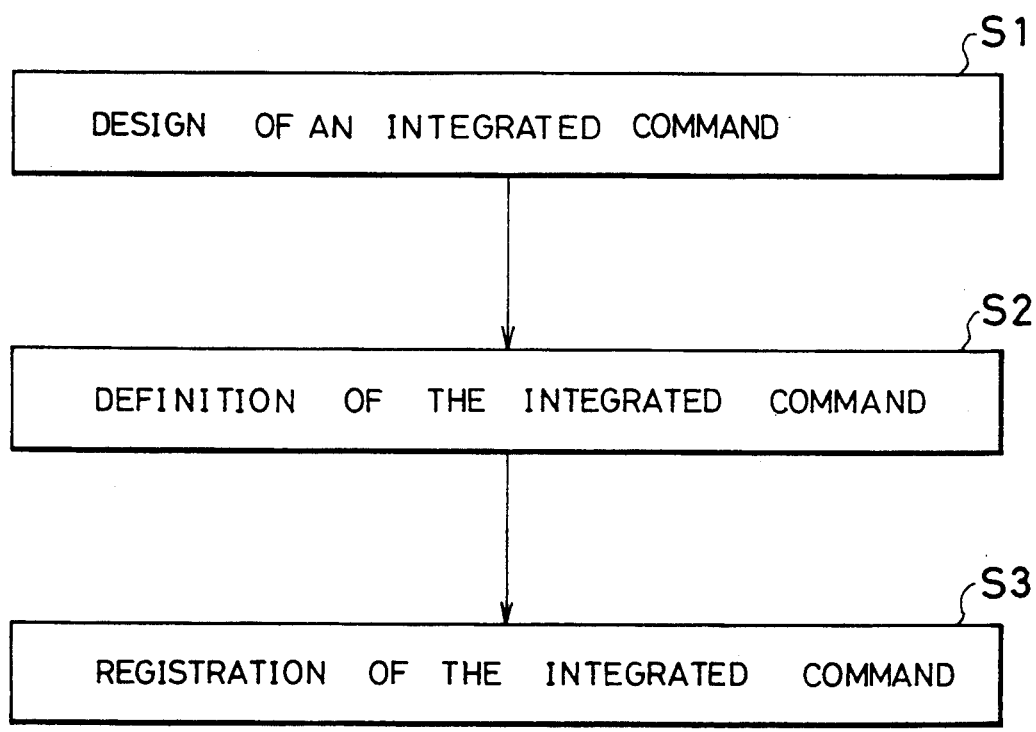

FIG. 3

INTEGRATED COMMAND DEFINITION SUPPORT TOOL

NAME: chkfzy

FORMAT: chkfzy COMMAND

EXPLANATION: chkfzy OFFERS A FUNCTION TO OUTPUT THE SYNTAX OF THE DESIGNATED COMMAND SO THAT THE SYNTAX OF THE COMMAND IS CHECKED PRECISELY AND EASILY.

NOTE: THE OPERATION ENVIRONMENT FOR THE INTERACTIVE COMMAND MANAGEMENT MODULE IS NECCESSARY TO EXECUTE chkfzy. chkfzy LOOKS FOR THE INTEGRATED COMMAND SYNTAX FILE AND THE BASIC COMMAND SYNTAX FILE IN THIS ORDER AND USES EITHER FILE FOUND FIRST TO OUTPUT THE SYNTAX OF THE COMMAND.

OUTPUT FORMAT OF THE COMMAND SYNTAX

FIG.5

TYPE OF PARAMETERS TO BE MANIPULATED BY THE INTERACTIVE COMMAND MANAGEMENT MODULE

| TYPE OF THE PARAMETER | CHARACTERISTICS · USE | INPUT DEVICE |
|---|---|---|
| QUALIFIER | PREDEFINED ALPHANUMERIC CHARACTERS LIKE THE COMMAND NAME. GIVES SPECIAL INSTRUCTION TO THE COMMAND. | K/B |
| CHARACTER STRING | ANY ALPHANUMERIC CHARACTERS USED FOR NOTE, ETC. | K/B |
| NUMERIC VALUE | INDICATES A NUMBER OR A VALUE. | K/B |
| ELEMENT | GRAPHICS ELEMENT DRAWN LIKE A LINE, A CIRCLE, A RECTANGLE, ETC. | MOUSE (K/B) |
| COORDINATES | COORDINATES VALUE INDICATING A WORKING POSITION. | MOUSE (K/B) |

FIG. 6

FORMAT OF THE INTEGRATED COMMAND DEFINITION FILE

```
INTEGRATED
COMMAND    ; GUIDANCE1 ;  BASIC          , BASIC         ,     , BASIC         ; RECOGNITION ;
NAME 1                    COMMAND         COMMAND         ...    COMMAND          MODE 1
                          NAME 11         NAME 12                NAME 1N

INTEGRATED
COMMAND    ; GUIDANCE2 ;  BASIC          , BASIC         ,     , BASIC         ; RECOGNITION ;
NAME 2                    COMMAND         COMMAND         ...    COMMAND          MODE 1
                          NAME 21         NAME 22                NAME 2N
```

FIG. 7
TYPE OF CURSOR AND ITS MEANING
IN CASE OF CHARACTER STRING INPUT 
IN CASE OF NUMERIC VALUE INPUT 
IN CASE OF COORDINATES INPUT 
IN CASE OF ELEMENT INPUT 
IN CASE OF COMMAND/QUALIFIER INPUT 
IN CASE OF PROCESSING COMMAND INPUT 

IMAGE OF OPERATION PROCEDURE FOR INTEGRATED COMMAND

FIG. 18

| BASIC COMMAND | INTEGRATED COMMAND ⌈CIR⌋ | | |
|---|---|---|---|
| | FIRST PARAMETER | SECOND PARAMETER | THIRD PARAMETER |
| CIRCLE BY A CENTER AND A RADIUS | CENTER | RADIUS | ⋯⋯ |
| CIRCLE BY A CENTER AND A POINT (PASS POINT) | CENTER | DOT ON CIRCUMFERENCE | ⋯⋯ |
| CIRCLE BY A ENTITY | CENTER | ENTITY | ⋯⋯ |
| CIRCLE BY THREE POINTS | DOT ON CIRCUMFERENCE | DOT ON CIRCUMFERENCE | DOT ON CIRCUMFERENCE |

SAMPLE 11k
12k
13k

EX:/PASS POINT/ STRING/

| INTEGRATED COMMAND "SAMPLE" | | |
|---|---|---|
| BASIC COMMAND | FIRST PARAMETER | SECOND PARAMETER |
| LINKED LINE | PASS POINT | ... |
| NOTE | STRING | LOCATION |

FIG.28
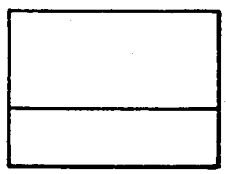  : INTEGRATED COMMAND
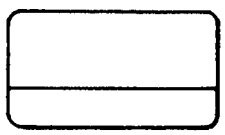  : BASIC COMMAND
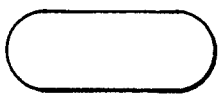  : COODINATES INPUT
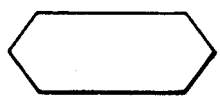  : ENTITY INPUT
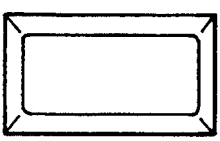  : K/B INPUT
<CR>   : RETURN(K/B OR MOUSE)

INTEGRATED COMMAND RECOGNITION APPARATUS AND METHOD FOR SELECTING AN OPTIMAL COMMAND AMONG NUMEROUS COMMANDS

BACKGROUND OF THE INVENTION

1. Field of Invention

This invention relates to the command operation to draw graphics by a graphic processing system.

2. Description of the Prior Art

Conventionally, the commands for drawing graphics by a graphic processing system have one operation with regard to the procedure for inputting of parameters and offer one function as result of the command execution. Therefore the number of commands will be increased whenever a new function is added. As a result, there will be a number of commands which have similar functions but different operations and different names.

For example, when an operator uses a basic command to draw a circle, he/she must consider the following before selecting one basic command;

(1) I want to draw a circle.
(2) Where shall I draw a circle on the screen.
(3) To draw the circle do I indicate the center of the circle?
   or do I Indicate a point on circumference?
   or do I draw a tangent circle touching to a line drawn already?
(4) To draw the circle of a desired size, do I indicate a radius of a circle?
   or do I indicate a point on circumference?
   or do I draw a tangent circle touching to the line drawn already?

In the process of considering the above procedures, it is realized that there exist a number of methods to draw circles and a number of commands corresponding to such methods. When selecting the command based on the procedures, the operator ordinarily must identify a corresponding command from a menu which is displayed on a screen showing several commands, many having names which are similar but not identical.

As has been described, the number of commands in conventional graphic processing systems will increase as the number of functions is increased. The operator must select an appropriate command to execute each function, even though there may be two or more commands having similar functions. Moreover, the operator has the problem of Identifying an appropriate command among numerous similar commands.

Accordingly, these problems result in an increased number of operation procedures and more complicated and confusing operations.

SUMMARY OF THE INVENTION

It is a primary object of this invention to solve the above problems, and to provide a command recognition apparatus that has automatic capability to select the optimal command from among numerous commands.

It is a further object of this invention to provide a command recognition apparatus that defines and stores integrated commands and recognizes one command among more than one commands. Accordingly, even though the appropriate command cannot be determined due to ambiguous parameter input operation of a first step, the confirmed result can be obtained by the sequential parameter input operations.

It is a further object of this invention to reduce the number of commands without reducing the number of functions, and to systematize the command operation.

It is a further object of this invention to provide a command recognition which defines and registers an integrated command which is utilized by the command recognition apparatus.

It is a further object of this invention to provide a command recognition method which has procedures to select one basic command from an integrated command.

A command recognition apparatus of this invention comprises an integrated command syntax storage means for memorizing the syntax of an integrated command which Integrate plural basic commands, an input means for selecting the integrated command memorized by the integrated command syntax means and entering parameters so that the selected integrated command runs, and, recognition means for recognizing a basic command to be executed out of plural basic commands which are integrated into the integrated command.

It is a further object of the invention to provide an integrated command syntax in the form of hierarchical tree structure for recognizing a command out of the plural commands. Such hierarchical tree structure has layers, each of which corresponds to the order of parameters to be entered. Each layer has an element which defines a type information of the parameter to be entered for the layer.

The type information is one type out of a qualifier which is a predefined name, a string which consists of any alphanumeric characters, a numerical value, a drawing entity, and coordinates value. The type information relates to a type of the input devices.

The recognition means further comprises default decision means for deciding the type of the parameter corresponding to a type of the input means. The default decision means decides the type of the parameter in the order of a string, a numeric value, a coordinates value in case that the type of the input means is a keyboard and/or a menu, and in the order of a drawing entity, a coordinates value In case that the type of the input means is a mouse and/or a tablet.

The recognition means further comprises next candidate selection means for selecting and temporarily executing other candidate commands which are not executed by the temporary execution means.

The recognition means further comprises assignment means for explicitly assigning a type of the parameter to be entered by the input means.

A further feature of the invention is the use of a command registration apparatus that comprises integrated command definition support means for outputting the basic command syntax memorized in the basic command syntax storage means in a predefined form. The integrated command definition means defines and memorizes, at least, a name of the integrated command and name of the basic command to be integrated. Further, the integrated command definition means defines and memorizes repeat mode for repeated execution of the integrated command.

A command recognition method of this invention comprises the steps of memorizing an integrated command which integrate plural commands; invoking the integrated command by an input means; entering a parameter by the input means based on a guidance displayed by the integrated command invoked; temporarily executing a command in case that plural commands integrated in the integrated command accept the parameter entered, and displaying the guidance and returning to the parameter input step; and executing a command as a confirmed command In case that the parameter entered specifies one command among plural commands integrated in the integrated command.

BRIEF DESCRIPTION OF THE DRAWINGS

FIG. 1 shows the operating environment for the integrated command in relation to the present invention.

FIG. 2 shows the registration procedure for the integrated command in relation to the present invention.

FIG. 3 shows the definition support tool for the integrated command in relation to the present invention.

FIG. 5 shows kinds of data concerned by the integrated command.

FIG. 6 shows an example to define the integrated command definition file.

FIG. 7 shows both kinds and meanings of cursors for the integrated command in relation to the present invention.

FIG. 18 shows a table illustrating the means for integration of the command to draw circles based on the first preferred embodiment of the integrated command.

FIG. 27 is a table to show the means for integration of the command to generate both line linkage and note commands based on the second preferred embodiment of the integrated command.

FIG. 28 shows the symbols used in flow charts based on the third preferred embodiment of the integrated command.

DESCRIPTION OF THE PREFERRED EMBODIMENT

Figure 4:
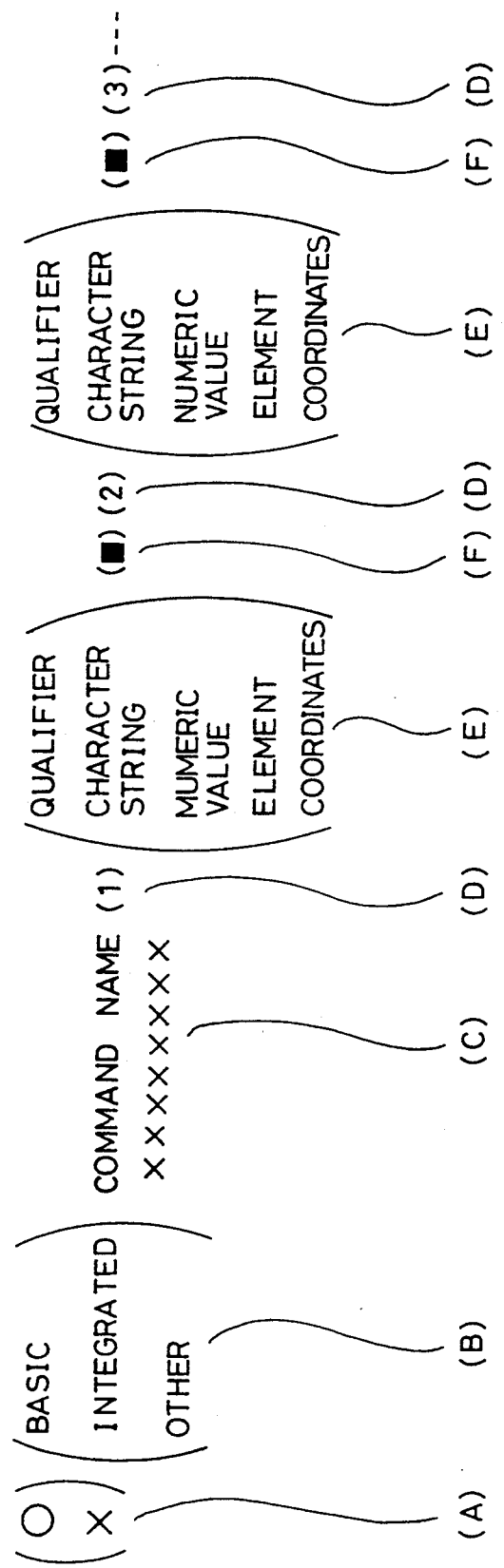
FIG. 4 shows the command syntax format for the integrated command.

To achieve the above objects and in accordance with the purpose of the invention, preferred embodiments will be described with accompanying drawings, hereinafter.

The "integrated command" is a new type of command which integrates a plurality of basic commands. The integrated command offers the ability to utilize any of the plural basic commands via the new command. The "basic command" is a command which has only one preferred operation and is distinguished from an "integrated command" which comprises plural commands and plural operations.

The integrated command has the same number of functions as the number of basic commands that are integrated therein. When using the integrated command, the operator does not need to give a instruction which identifies the particular function to be utilized. The function to be utilized is decided automatically by the system which controls the integrated command, based on parameters entered. The method of utilizing the integrated command in the system may be considered an "integrated command method".

Because the integrated command include multiple functions, operator's action, that is successive actions for selecting a command, may include an ambiguity. Accordingly, integrated command selects a final basic command to be executed based on parameter(s) entered by the operator's action. The operator's action may be successive and continues the command selection operation along with the stream of the operator's thinking using the integrated command.

For example, if the operator wants to "draw a circle", an integrated command "circle" should be selected at first. Then, the command "circle" generates an operator "guidance", that is for example, "Where do you want to draw?" or "indicating a center?"

"indicating a dot on the circumference?"

"indicating a tangent circle?"

Based on the prompt from the guidance, the operator does what he/she want without selecting or indicating the function shown in the guidance.

As thus far described these functions may appear similar to conventional technique in the so called "command language methods" and "menu guide method" for combining plural commands. However, the integrated command method differs from both of "command language method" and "menu guide method" as follows.

The conventional function for combining plural commands, like a "command language", executes plural commands sequentially in order. Therefore, the combined commands defined by the command language has meaning in its defined or serial order. The execution result differs when the defined order is changed. By contrast, the integrated command arranges plural commands in parallel and selects and executes one or more commands from among the plural commands. The execution result of the integrated command method is the same as long as entered parameters are same, even though the defined order for parallel arrangement of the plural basic commands is changed. The execution result only depends on the parameter(s) entered.

The "menu guide method" also differs from the integrated command method. In the "menu guide method", an item must be selected from a menu in order to identify a desired function. The function to be executed is decided by a hierarchical menu selection operation, in which the operator proceeds from a primary menu to one or more secondary menu in order to identify the one command that provides the desired function.

In case of the integrated command method, however, while it may be necessary to select the name of an integrated command from a primary menu to invoke the integrated command, it is not necessary to perform secondary menu operation(s) after the invocation. The function to be executed is automatically selected from among several candidate functions when the operator simply identifies a desired drawing operation along with the guidance.

Embodiment 1

FIG. 1 shows the operation environment for the integrated command method in relation to the present invention. In FIG. 1, an integrated command definition file 1 (one example of an integrated command definition means) stores both the name of an integrated command and the names of the basic commands to be integrated. The integrated command definition file 1 defines which basic commands are integrated into the integrated command. A basic command syntax file 2 (one example of basic command syntax storage means) stores basic commands and the parameters for the basic commands as basic command syntaxes. An integrated command registration utility 3 has the function to convert the integrated command definition file to a recognizable form. An integrated command syntax file 4 (one example of the integrated command syntax storage means) stores the recognizable form generated by the integrated command registration utility. An interactive command management module 5 (one example of a recognition means), comprising two modules 5a and 5b, recognizes both of the basic commands set and the integrated commands set in the integrated command syntax file 4. The interactive command management module 5b analyzes and recognizes both of the basic command and integrated command, while the interactive command management module 5a only analyzes and recognizes the basic command. An integrated command can be defined and memorized in the integrated command definition file 1, so that there is no effect on the interactive command management module 5 if a new integrated command is added and an existing integrated command is modified.

An outline of the registration process for an integrated command is explained hereinafter with respect to FIG. 1. FIG. 1 shows the registration environment of the integrated command and the operation environment of the interactive command management module 5.

The integrated command can be defined quite freely, but there are some restrictions. The following registration operation is necessary so that the interactive command management module 5b is able to utilize the integrated command defined thereby.

At first, the integrated command definition file 1 is generated by an editor. The integrated command definition file 1 comprises three basic elements, a name of the integrated command, a guidance, and a succession of names of the basic commands to be integrated. The integrated command registration utility 3 generates the integrated command syntax based on the integrated command definition file 1 and registers it in the integrated command syntax file 4. The basic command syntax file 2 only stores and manages the operative specification of the basic commands, i.e., the basic command syntax.

The integrated command registration utility 3 generates the integrated command syntax file 4 by utilizing the basic command syntax file 2. The integrated command syntax file 4 memorizes the integrated command syntax derived from the integrated command definition file 1 and the basic command syntax stored in the basic command syntax file 2. When the interactive command management module 5 is invoked, it looks for the integrated command syntax file 4. If there is the integrated command syntax file 4, the interactive command management module 5 sets the environment where the integrated command can be executed by using the integrated command syntax stored in the integrated command syntax file 4. If there is no file 4, the interactive command management module 5 sets the environment where only the basic command can be executed by using the basic command syntax stored in the basic command syntax file 2.

The detailed registration procedure is explained hereinafter. The integrated command has to be registered before the interactive command management module 5b executes the integrated command.

FIG. 2 shows a procedure of registration for the integrated command. The first step S1 is the design of the integrated command. The second step S2 is the definition of the designed integrated command. Finally the third step S3 is the registration of the defined integrated command.

The design of the integrated command according to step S1 has to follow the applicable regulations for the definition of the integrated command. Same examples or such regulations are:

(1) Only basic commands should be integrated,
(2) Maximum number of the basic commands to be integrated is 32,
(3) If the basic command has a halfway execution, there should not be any branch operation thereafter.

It is possible to integrate the basic commands freely within the limits of the regulations for the definition of the integrated command.

In accordance with the definition step S2, a definition support tool for defining the integrated command, as shown in FIG. 3, is used. The definition support tool is a program (program name: chkfzy) to confirm the syntax of the basic command. This tool displays or prints the syntax of the designated basic command in a form shown in FIG. 4.

FIG. 4 shows the command syntax displayed or printed by this tool.

At (A), mark "O" is generated where there is an integrated command. Mark "X" is generated where there is a basic command.

At (B), a type of the command is shown. There are three types of command. They are:
  basic command: a standard command,
  integrated command: a defined command in the integrated command definition file 1,
  other command: a command defined by command language.

At (C), name of the command (alphanumeric character) is shown.

At (D), the number of a parameter is shown like (1), (2), . . . in order.

At (E), a type of the parameter is shown. There are five types of the parameters, as summarized in FIG. 5.

These types are divided in following two groups.
  qualifier, string, numeric: this group is selected preferentially when a keyboard or a menu is used for data entry.
  entity, coordinates: this group is selected preferentially when a mouse or a tablet is used for data entry.

At (F), mark "■" is shown in case that a halfway execution occurs after entering the parameter.

The definition of the integrated command in FIG. 2 according to step S2 is explained hereinafter.

The definition of the integrated command is a procedure to generate the integrated command definition file 1 by using an editor program. The integrated command syntax file 4 has a multi-line format illustrated in FIG. 6. The integrated command syntax file 4 defines one integrated command per line. The definition of one integrated command defines four informations separated by ";" in the following order.

(a) a name of integrated command.

This name is the command name which is entered in the command control interactive module 5. This name should consist of eight or fewer alphanumeric characters.

(b) a display name for identification.

This name is the command identification to be displayed at the head of each guidance. This name should consist of any eight or fewer alphanumeric characters.

(c) a succession of the names of the basic commands.

The names of the basic commands are separated by ",".

(d) a recognition mode.

This mode is assigned by bit pattern. Each bit in the pattern has the following meanings.
  bit position 0(zero): assignment of repeat part.
    =0(zero): repeat the command at a predefined repeat part.
    =1(one): repeat the command at the first parameter.
  bit position 1(one): assignment for clearing the parameter value for repeat operation.
    =0(zero): clear all parameter values entered previously before getting a new parameter value.
    =1(one): clear previous parameter value by getting the corresponding parameter value
  bit position 2(two): not used
  bit position 3(three): not used
  bit position 4(four): instruction for analyzing a designated position whereat an entity is existing.
    =0(zero): nominate the input as a selection of the entity or as an entry of coordinates.
    =1(one): nominate the input only as a selection of the entity.
  bit position 5(five): instruction for analyzing a designated position whereat no entity is existing.

=0(zero): nominate the input as an entry of coordinates.
=1(one): nominate the input as a selection of the entity.

In this case the entity is looked for from wide area.
bit position 6(six): not used
bit position 7(seven): not used The followings is one example of the integrated command definition:

OFSTCD;OFFSET;OFSTIC;13

This integrated command "OFSTCD" only integrates the basic command "OFSTIC". The recognition mode "13" sets bits at positions 0, 1 and 4 to "ON".

Assume that the basic command "OFSTIC" has two parameters, that is, an entity to be offset and an offset position. When the entity to be offset and the offset position are entered, the offset command is executed. When the offset command is repeated, the command waits for the first parameter entry due to bit 0 having a value 1.

At this point, the previous parameter values are still effective because the clearing of the parameter value is not taken yet due to bit 1 being equal to 1.

It will be explained hereinafter how to register the integrated command, in accordance with step S2 of FIG. 2.

The integrated command registration utility (program name: "setfzy") inputs the integrated command definition file 1 and converts the integrated command definition to a form which is recognized by the interactive command management module 5. The integrated command registration utility 3 registers the integrated command in the execution environment of the interactive command management module 5. The format to invoke this utility is:

"setfzy source"

The integrated command registration utility "setfzy" registers the integrated command in accordance with the integrated command definition file indicated by "source". "setfzy" generates the integrated command syntax file by inputting the integrated command definition file 1 indicated by "source" and the basic command syntax file 2.

The interactive command management module 5, during its start-up time, looks for the integrated command syntax file 4 at first. If it is found, it will be utilized to recognize the con, and. If not, the basic command syntax file is utilized as usual.

The manner of the operation will be explained.

The guidances and cursors will be explained hereinafter. As has been described, the integrated command is able to select a method of entering parameters out of plural entering methods. The basic command to be executed will be changed depending on the selected entering method. Due to this feature, one integrated command can operate as If it includes the functions of plural basic commands.

However, due to this feature, the methods of entering parameters are more complicated as compared to the entering methods of the basic commands. To cope with this inconvenience, the guidance and cursor can be specified depending on the operation of the integrated command as follows;

(1) guidance

The guidance of the integrated command shows all of the parameters of the integrated basic commands. The parameters of the basic commands are separated by "/" in a guidance area of the screen. Any duplicated parameters, however, are combined into one parameter. In case the guidance of the integrated command is too long to show in a guidance area, the exceeding part of It cannot be shown. When an operator need to see the exceeding part, the order of the parameters is modified by changing the order of the display priority.

(2) cursor

The shape of the cursor is changed, as shown in FIG. 7, depending on the type of parameter displayed at left side of the guidance.

The selection operation for the integrated command will be explained hereinafter. The integrated command can be selected by entering the integrated command name (the name defined in the integrated command definition file) in the same manners as the basic command is selected. It is possible to enter the command name from a keyboard or out of menus.

The parameter input operation will be explained hereinafter.

There are three methods to enter the parameter for indicating a branching destination.

(1) Parameter input by automatic branch;
(2) Parameter input by explicit setting;
(3) Parameter input by next-candidate selection.

At first, (1) the "parameter input by automatic branch" will be explained.

The basic command can correctly recognize the data corresponding to the parameter because each of the basic commands defines which data type should be entered for each parameter. However, the integrated command is a command which integrates plural basic commands in parallel. Therefore, there may be a case where it is not possible to decide which parameter should correspond to the data entered. Under such situation, the basic command to be executed is not decided and the result expected by the operator is not given.

To prevent such ambiguous situation, the following rule is followed for the interpretation of the integrated command (it is possible to change the rule by an operation described later):

1) The parameter entered from a keyboard or menus will be used to retrieve a branching destination based on the following order;
  qualifier→character string→numeric value→entity→coordinates.

2) The parameter entered from a mouse or a tablet will be used to retrieve a branching destination in the following order;
  entity→coordinates.

In the case that both character string and coordinates can be entered, the keyboard entry "10,20", for instance, is regarded as a character string but not a coordinates value "10,20", due to the different predefined orders for the two input devices. This input method which decides the branching destination depending on input devices is called herein "parameter input by automatic branch".

(2) The "parameter input by explicit assignment" will be explained hereinafter. If the operator wants to indicate a coordinates value with numeric values when both string and coordinates can be entered, he can indicate the branching destination before entering the parameter by the method called "parameter input by explicit assignment".

The type of parameter to be entered can be indicated explicitly by the following operations, and the parameter order displayed in the guidance area and a shape of the cursor can be changed by the following operations.
1) Indicating input by character string (String)^S^K
2) Indicating input by value (Value):^V
3) Indicating input by coordinates value (Coordinates): ^C
4) Indicating input by entity (Entity):^E
5) Indicating input by next candidate (Parameter):^P (^S means to depress both of control key marked by^and a S key at the same time.) For example, when^S is entered, the next parameter entered will be decided as a character string.

(3) The "parameter input by next-candidate selection" will be explained hereinafter.

When automatic branch is executed between entity and coordinates, the operator has to confirm the branching result. When entity input is selected as the branching destination, the entity is displayed by high intensity. When coordinates input is selected, the position is displayed by a mark "X". Then the operator can re-select the branching destination by the function "indicating branching destination" by "next-candidate selection" between entity and coordinates, that is, "entity→coordinates" and "entity←coordinates".

In the case that both branches to the entity input and the coordinates input are available, it is possible to change the branching destination by the next-candidate selection after parameter input from a mouse or a tablet.

In case that both branches to the entity input and to the coordinates input are available, the entity input should be selected with priority if the input was done by a mouse and the selectable entity is found at an indicated location. As a result, a graphic entity at an indicated location is highlighted with high intensity.

If the operator enters the parameter as a coordinate value, then "^0" should be entered immediately after mouse input and before entering the next parameter. After entering "^0", the graphic displayed with high intensity goes back to normal intensity. Further, the mark "X" will be displayed to show the location entered by the mouse as the coordinates. It is possible to repeat there selection operation by entering "^0" based on the next-candidates selection, that is:

entity→coordinates→entity→ . . . .

The execution of a command will be explained hereinafter.

When the procedure branches the tree structure and reaches to a leaf, the procedure will execute the basic command corresponding to the leaf. The leaf means the terminal parameter of branch. That is, the leaf is a parameter which does not have any descendant parameters at lower layer. When the leaf is found the command will be executed as well as any basic command being entered directly. One complete cycle of a command execution, thereby, ends. The stage of executing one expected command out of plural commands is called "an integrated command has been confirmed"

When the leaf is not found and plural basic commands exist as candidates, one command out of these candidates is temporarily selected and executed to show a temporary execution result. But the execution at this stage will not be confirmed due to the possibility of selecting other basic commands. This stage is called "an integrated command is in a temporary confirmed execution". A guidance in the stage of the temporary confirmed execution will be displayed as follows;

/confirm(^F)/next(^0)/

This guidance suggests the following operations;
  (1) In case that the result shown by the temporary confirmed execution is satisfactory:
    enter "^F" for confirmation.
  (2) In case that another branching destination should be selected:
    enter "^0" for temporary execution of other candidate basic commands.

The repetition of the command operation will be explained hereinafter. The integrated command also repeats parameters until another integrated command is entered or a basic command.

The integrated command can have a repeating part which is the parameter location from which the operation should be repeated. The repeating part of an integrated command is defined in the integrated command definition file. The repeating part is selected from the following three types.
1) The parameter location defined as the repeating part for the previously executed basic command of the currently executing integrated command.
2) The first; parameter of the integrated command.
3) The parameter location where the procedure was branched automatically by the parameter entered first in a previous repeat operation.

The selection of the repeat type mentioned above can be defined by the bit-patterns of a recognition mode in the integrated command definition file.

Figure 8:
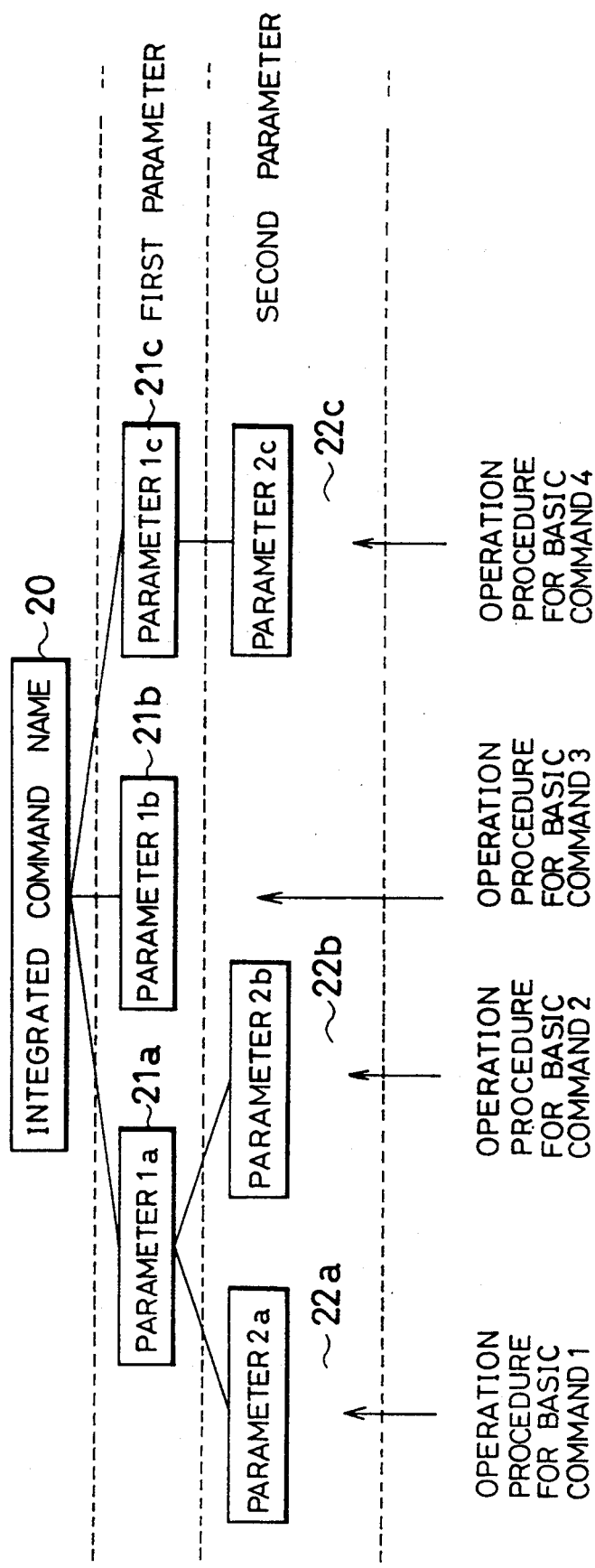
FIG. 8 shows the image of the operating procedures for the integrated command.

FIG. 8 shows the image of operating procedures in using the integrated command. Since the integrated command integrates the basic commands, input parameters can constructs a hierarchical tree structure. The top layer has a root of the tree structure which is the integrated command name 20. The second layer is used for the first parameter and the third layer is used for the second parameter and so on.

The maximum number of branches, that is, the number of leaves are equal to the number of integrated basic commands. Each path through the branches corresponds to the operation procedure for the integrated basic commands under the condition that each of the integrated basic commands has only one operation and does not have any branch paths during the operation.

The integrated commands, different from the basic commands, have several options, such as parameter 1a, 1b, 1c, for the first parameter as shown in FIG. 8. These options will be displayed as a guidance on a screen.

If some basic commands have the same parameter at same layer, the guidance displays only one option corresponding to such plural basic commands and eliminates the duplicated displays. The guidance shows those possible descendant options which have the same ancestor option selected at an upper layer.

The options for those parameters are listed on the display. Concerning those parameters in the guidance, a parameter on the farther left side of the guidance has the higher priority for automatic branch. Moreover, for the parameter with the highest priority, different shaped cursors will be displayed corresponding to the type of the parameter such as, coordinates, numeric, character string and entity.

Figure 9:
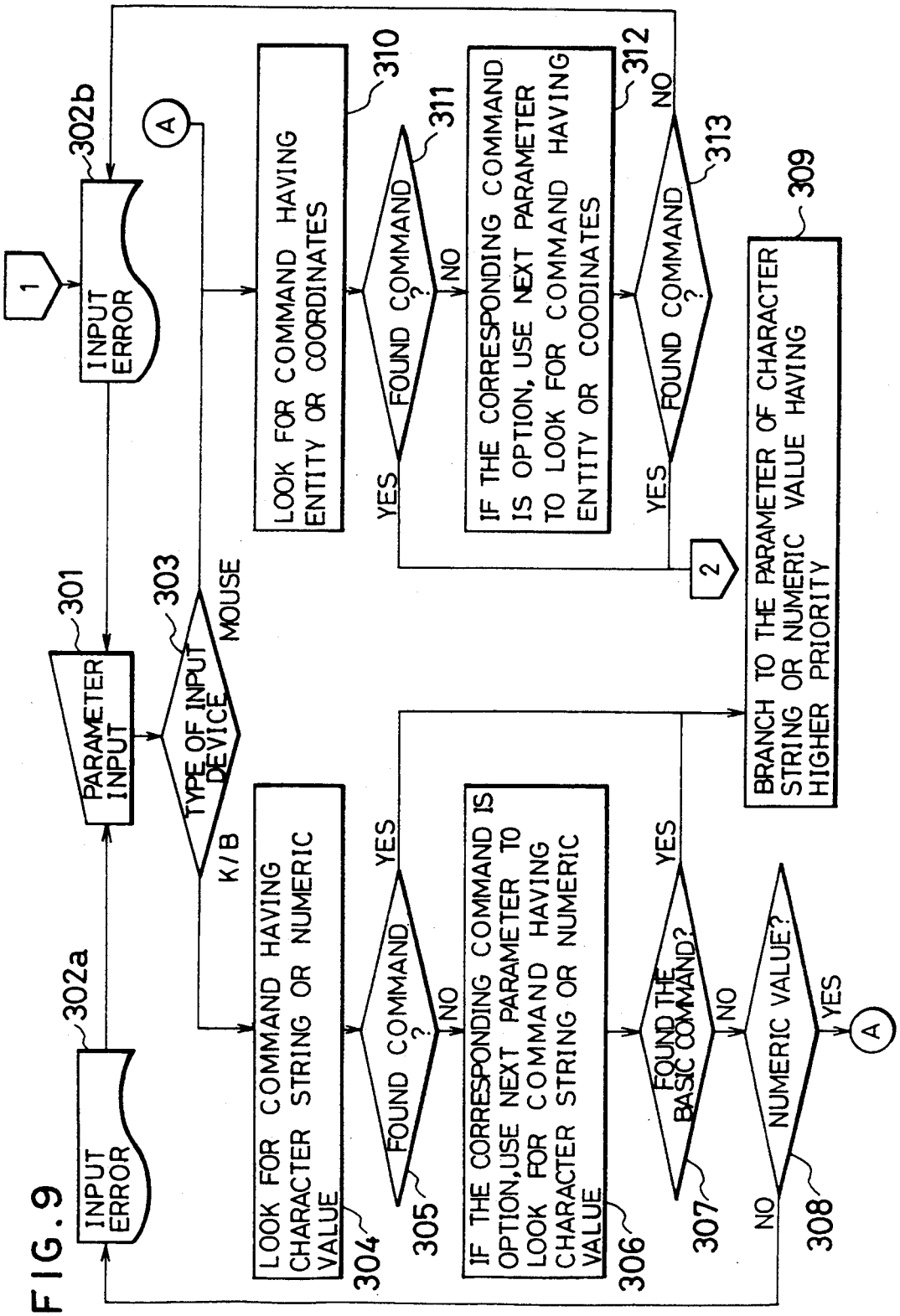
FIG. 9 shows the flow chart of parameter branch means for the integrated command recognition when the integrated command is in execution.
Figure 10:
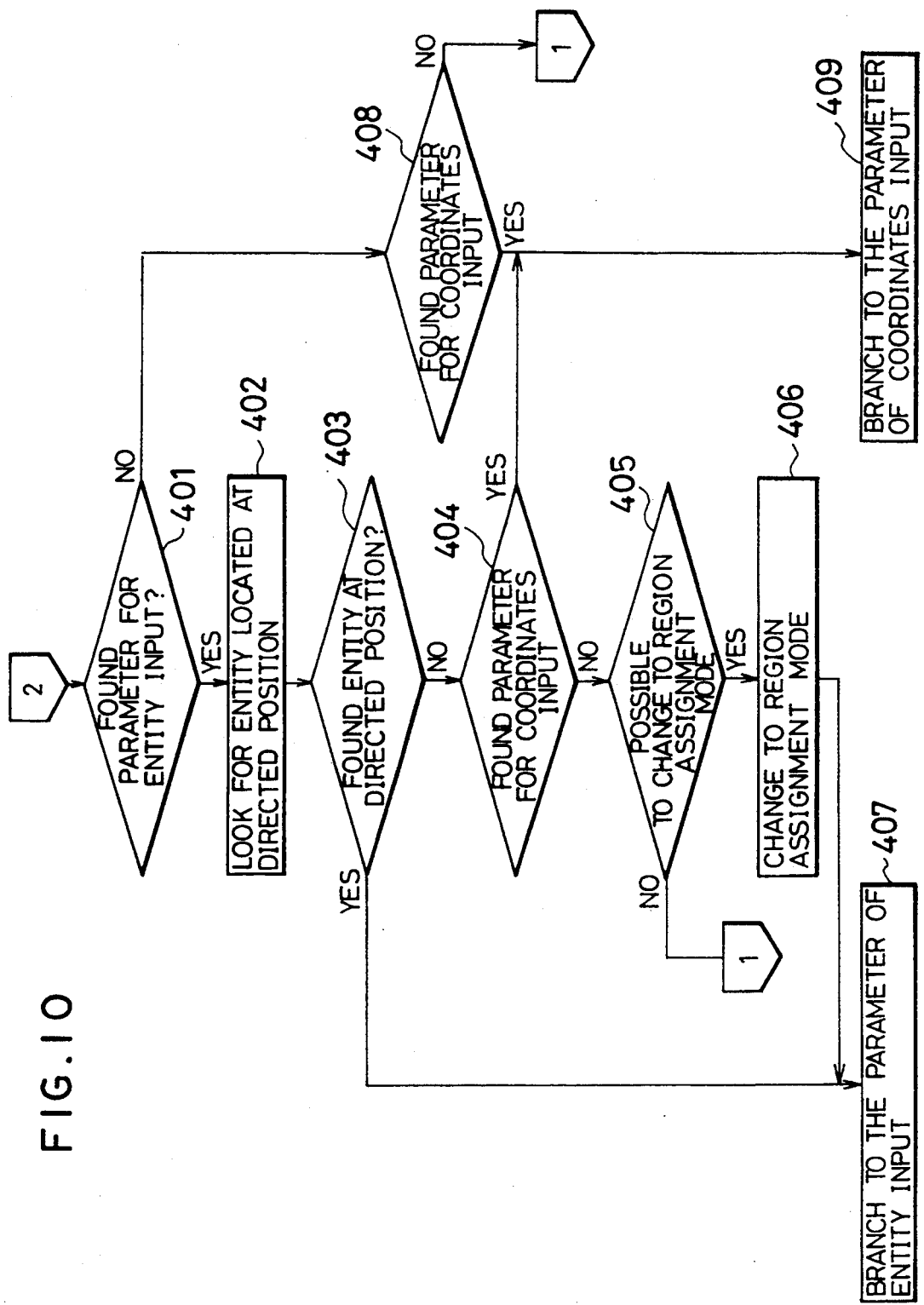
FIG. 10 shows the flow chart of parameter branch means for the integrated command recognition when the integrated command is being executed.

FIGS. 9 and 10 show flow chart of the parameter branch means for integrated command recognition when the integrated command is invoked. The parameter branch means is part of the interactive command management module 5b and executes an automatic branch to decide what procedures should be taken next in case of recognizing the command by input parameters.

The parameters of the integrated command can be entered as well as conventional basic commands. When the operator inputs the parameter of the integrated command, the command interactive management module 5 (in FIG. 1) recognizes the integrated command in the integrated command syntax file 4 by the parameter branch means (in FIGS. 9 and 10).

The automatic branch is realized by the automatic decision of the branch parameter.

Procedures for automatic branch will be described in detail hereinafter in accordance with FIGS. 9 and 10. A parameter is entered at step 301. Then the parameter is checked based on an input device at step 303. If the device is a character string input device, such as a keyboard or menus, the procedure branches to step 304. If the device is a coordinates input device, such as a mouse or a tablet, then the procedure branches to step 310.

From steps 304 through 309, recognition procedures for a character string are shown.

The procedure at step 304 retrieves the command which requires the parameter of either a character string input or a numeric input among the candidates of integrated basic commands. At step 305, the retrieval result at step 304 is examined to determine whether a corresponding candidate command exists or not. If a corresponding candidate command is found, the procedure goes to step 309. If a corresponding candidate command is not found at step 305, the procedure tries to select a candidate command using the next parameter of the command in case that the parameter is optional at step 306 and at step 307.

Even if step 307 is unable to find out the corresponding candidates, then the procedure at step 308 judges whether the entered parameter is a numeric input or not. If the parameter is a numeric input, the procedure branches to step 310 by recognizing the numeric input as a coordinates input.

If the parameter is not a numeric input, then the procedure at step 302a generates an input error message and returns to a parameter input at step 301 again.

Recognition procedures for coordinates are shown from steps 310 through 409. The procedure at step 310 is to retrieve the command that requires parameters of either of a coordinates or a graphic entity among candidates of the integrated basic commands. Step 311 judges the retrieval result of step 310. If a command of a coordinates input or a graphic entity input is found, the procedure goes to step 401. If not, the procedure branches to step 312. At step 312 and step 313, if the parameter is optional the procedure tries to select a candidate command using the next parameter.

The procedure from steps 401 through 409 judges whether the input is a coordinates or a graphic entity. If a parameter of a graphic entity input is retrieved at step 401 the procedure goes to step 402, and if not, the procedure branches to step 408. The procedure at step 402 retrieves whether a graphic entity is located at the position indicated by a coordinates input or not. Step 403 judges whether or not there is a candidate which accepts the positioned graphic entity. If a candidate is found out, the entered parameter is recognized as the graphic entity at step 407, and if not, at step 401, the procedure retrieves whether a parameter of coordinates input exists or not among the candidates of the basic commands.

If the parameter of a coordinates input is not found among the candidates of the basic commands a procedure of graphic entity input at step 407 is executed after changing the designation method for a graphic entity at steps 405 and 406.

When a parameter of a graphic entity cannot be found among the candidates of the basic commands at step 401, the procedure at step 408 determines whether or not a parameter of coordinates exists among the candidates of the basic commands. If this parameter exists, the entered parameter is construed as a value at step 409. If not, the procedure returns to a parameter input at step 301, after outputting an error message at step 302b.

In this way, the entered parameter is always regarded as judging materials for automatic branch. The entered parameter temporarily decides the branch. The temporarily decided branch will be finally decided by entry of the next parameter input or by the input of "confirmation".

FIG. 11 through FIG. 17 show examples how to operate the integrated commands. In all of these Figures, a graphic display area 11 is used to display graphics in the graphic processing system. A guidance area 12 is used to display parameters of the integrated commands. A command input area 13 is used to input commands.

As one example, the operation of an integrated command named "CIR" will be described hereinafter. "CIR" is the integrated command which comprises four basic commands to draw a circle, as is shown in FIG. 18.

In utilizing a basic command, it is essential to think what kind of features should be used to draw a circle before the menu selection.

For example, there are four basic commands to draw a circle using the different features.

(1) In case a center of a circle and its radius are known: "circle by a center and a point".

(2) In case a center of a circle and a dot on circumference (in other words, pass point) are known: "circle by a center and a point"

(3) In case a center of a circle and a tangent entity are known: "circle by entity"

(4) In case three dots on a circumference are known: "circle by three points"

On the contrary, the integrated command "CIR" features the aforementioned four functions in it because of the integration of these four basic commands.

Only "CIR" should be entered at the first stage. Then one of these four commands can be utilized for drawing the circle using one of these four commands.

With another view, the integrated command is able to combine four kinds of commands in the menu into one.

Enter of parameters after entering the command "CIR" follows basically the same procedure as when a basic command is utilized, as follows;

In case a center dot of a circle and its radius are known (case 1):

"CIR, center of circle, radius"

In case three dots on a circumference are known (case 4):

"CIR, a dot on circumference, a dot on circumference, a dot on circumference"

In those two cases, it is obvious that only the name of the command is replaced by "CIR". In the foregoing cases (2) and (3), the following procedures should be taken including the previously mentioned "confirmation" operation which is used to indicate the temporary execution as a confirmed one.

(2) In case a center dot of a circle and a dot on circumference(pass point) are known:
"CIR, center dot of circle, a dot on circumference (pass point), confirmation"

(3) In case a center dot of a circle and a tangent element are known:
"CIR, center dot of circle, entity, confirmation"

Figure 11:
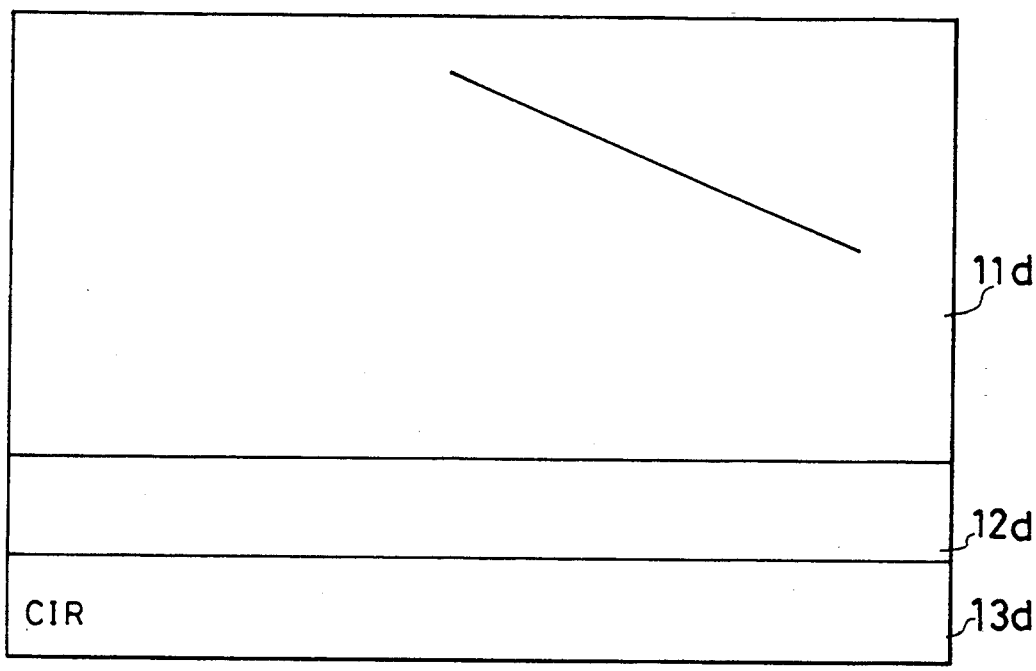
FIG. 11 shows the operation procedures based on the first preferred embodiment of the integrated command.

FIG. 11 shows the screen displaying a straight line in a graphic display area 11d. A circle will be drawn in the same screen as the line is drawn.

At first, the integrated command name "CIR" should be entered in the command input area 13d.

Figure 12:
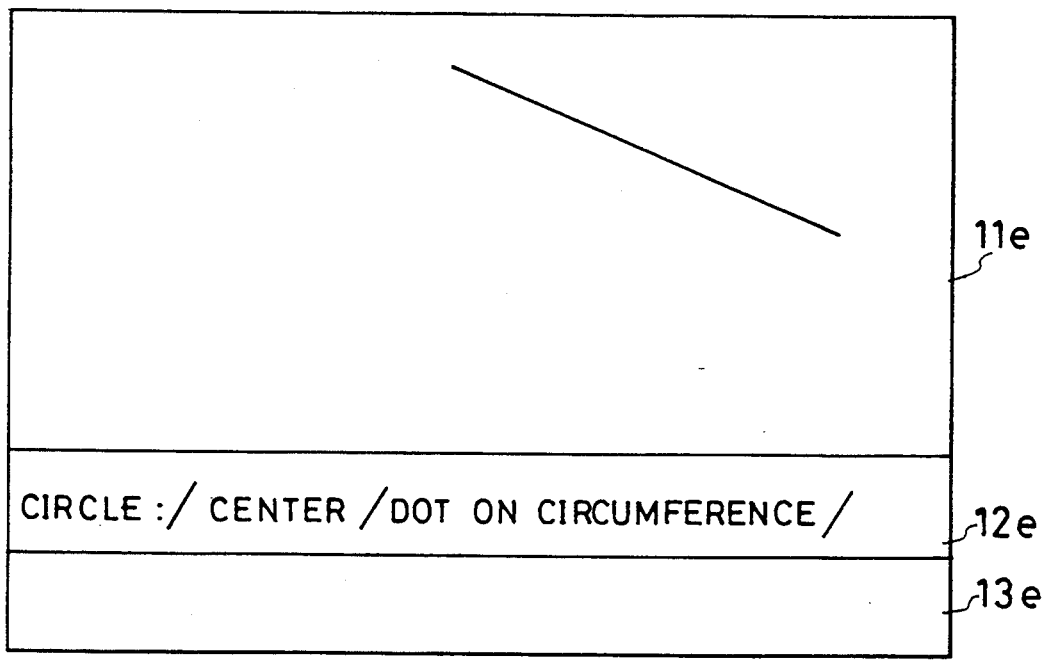
FIG. 12 shows the operation procedures based on the first preferred embodiment of the integrated command.

As is shown in FIG. 12, the first guidance of the integrated command "CIR" is displayed as a guidance in the guidance area 12e. It is possible to indicate either "center" or "dot on circumference". Both indications are made by coordinates values.

Figure 13:
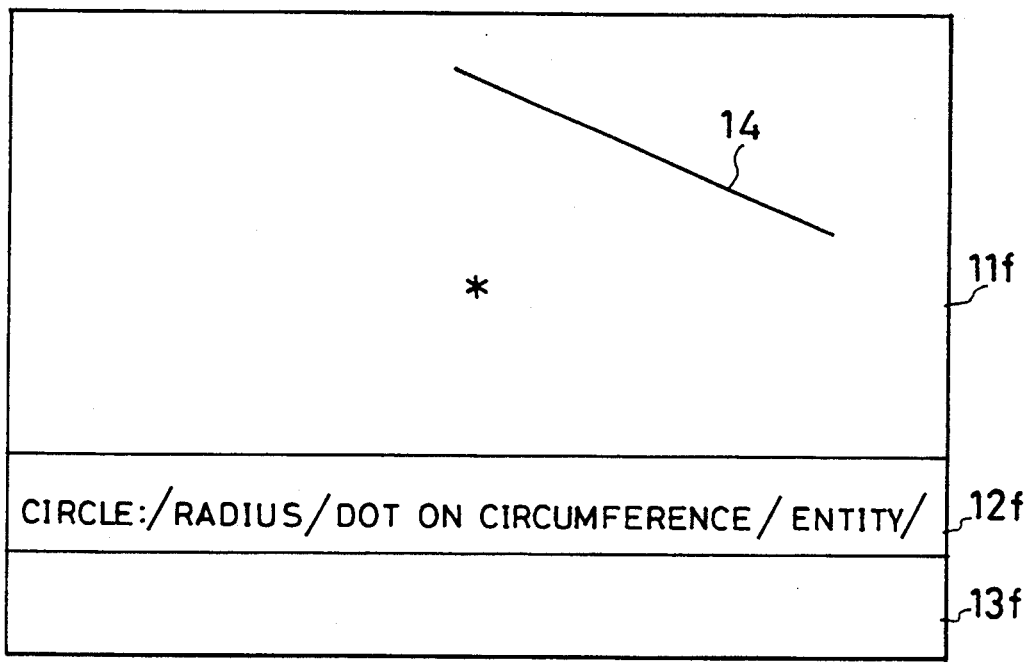
FIG. 13 shows the operation procedures based on the first preferred embodiment of the integrated command.

By a coordinates input to the stage shown in FIG. 13 a dot will be displayed in the graphic display area 11f. The guidance area 12f displays a next parameters as the second guidance. It is understandable now that a circle can be drawn by indicating a radius of a circle because "radius" is displayed as one of the parameters in the guidance 12f.

Assuming that a "radius" is entered, the numeric value of a radius is entered by the keyboard in a command input area 13f.

Figure 14:
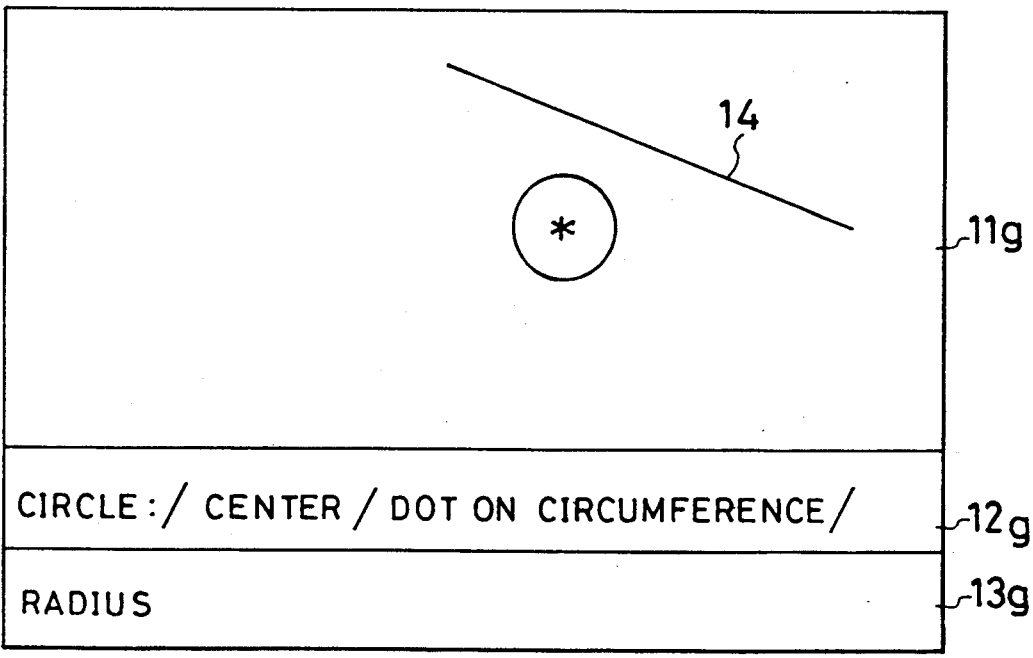
FIG. 14 shows the operation procedures based on the first preferred embodiment of the integrated command.

Then, as is shown in FIG. 14, a circle having the dot in the center of its circle with the radius is drawn and such drawing is automatically confirmed. This happens due to the difference of input device. This integrated command "CIR" accepts numeric value only for the "radius" parameter among the second parameters shown at 12f in FIG. 13. The "dot on circumference" parameter is entered by coordinates input and "entity" parameter is by entity input.

The input device of the coordinates input and the entity input is a mouse or tablet, not keyboard.

Resulting from the determination of a graphic, the first guidance of "CIR" will be displayed again in a guidance area 12g, like the guidance 12e shown in FIG. 12.

Figure 15:
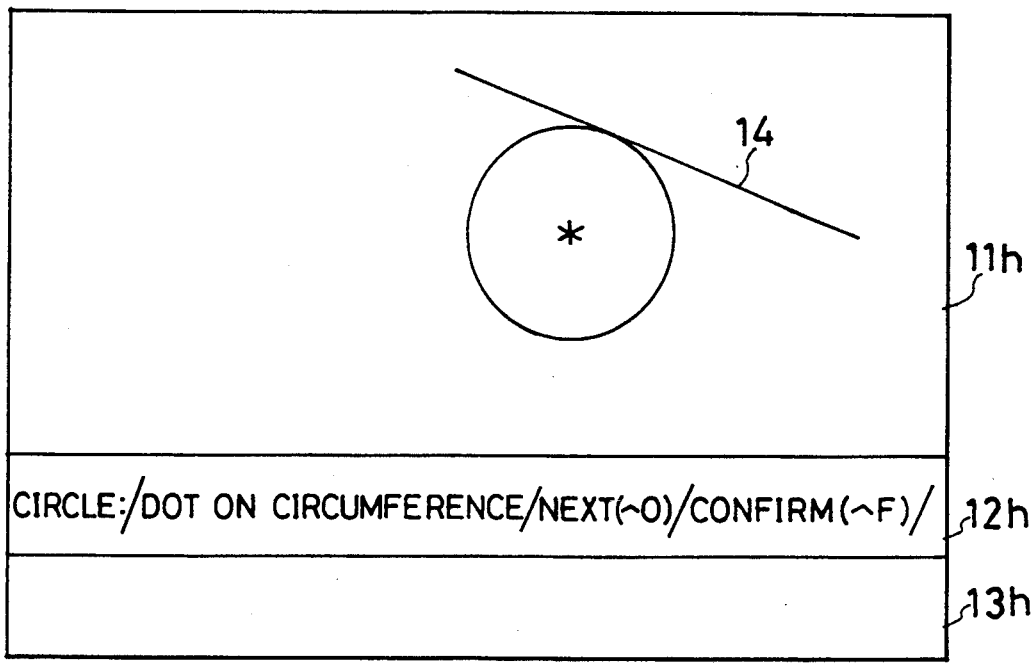
FIG. 15 shows the operation procedures based on the first preferred embodiment of the integrated command.

Assuming that an "entity" is entered at the stage shown in FIG. 13, that is, indicating a straight line 14 displayed in a graphic display area 11h by the mouse, a circle, for example, which is tangent to the line 14, will be temporarily drawn in a graphic display area 11h as shown in FIG. 15. Up to this stage, only two positions are entered for drawing a circle. Using these two positions there are three ways to draw a circle, for example, the first position is considered either the center of circle or a dot on the circumference of a circle. And second position is considered either straight line or a dot on the circumference of a circle.

Since, at this stage, ambiguous definition to draw a circle by utilizing those two positions, has been given, "confirmation" cannot be executed automatically.

And third guidance will be displayed in a guidance area 12h as is shown in FIG. 15. If the circle drawn is not a desired one, a parameter "^0" for the next candidate is entered to get the next candidate circle by utilizing two positions. On the other hand, if the circle drawn is the desired one, the parameter "^F" for "confirmation" is entered to confirm the temporary execution.

Figure 16:
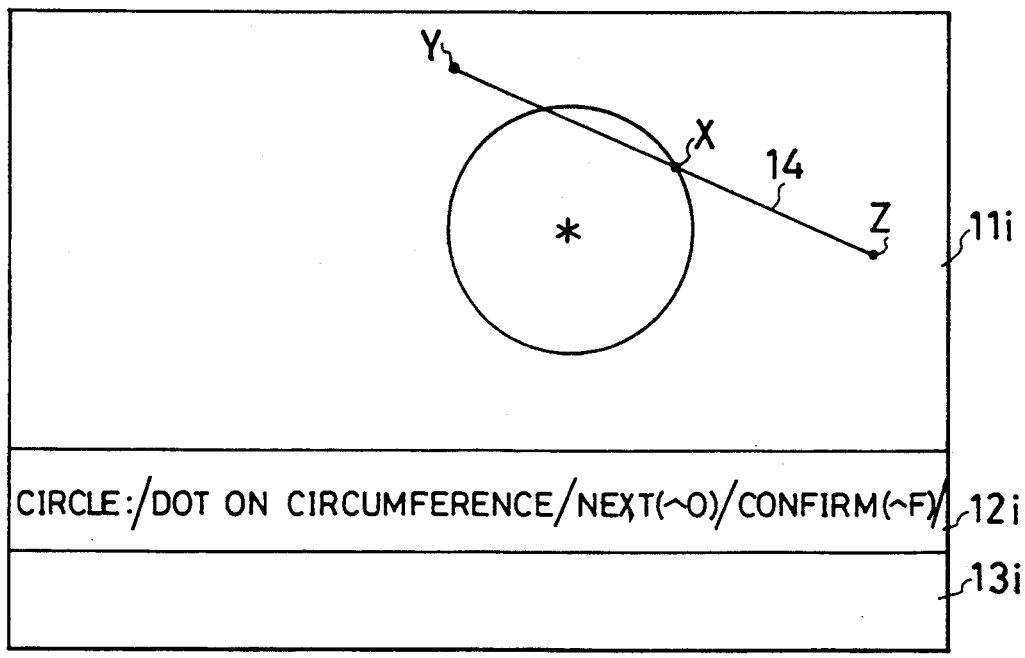
FIG. 16 shows the operation procedures based on the first preferred embodiment of the integrated command.

FIG. 16 shows the stage when "next candidate" is selected at the stage shown in FIG. 15. When the operator selects a center dot in a circle and a straight line as an entity, there are other types of circles, for example, a circle having two dots on the line as displayed in the area 11i. In this case, according to the executing mode, coordinates values of the center dot or other dots (ex: X, Y, Z) of the line will be selected to draw the next circle. The execution results can be displayed in turn by entering "next candidate". Automatic confirmation will not be executed at this stage, because the further coordinates (the third dot as the third parameter) can be entered.

Figure 17:
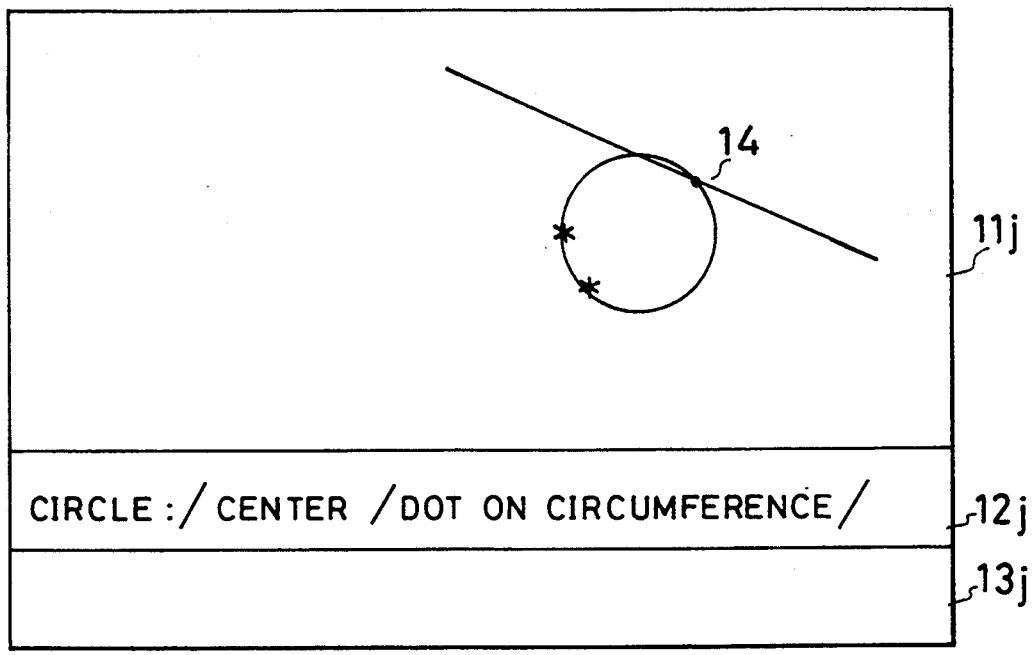
FIG. 17 shows the operation procedures based on the first preferred embodiment of the integrated command.

FIG. 17 shows the stage in the case that the coordinates value is entered selecting the parameter "dot on circumference". At this stage, a circle requiring three dots is drawn, since "dot on circumference" is selected for the third parameter. Then a circle having three dots will be confirmed automatically.

The hierarchical tree structure of the integrated command CIR will be now explained.

Figure 19:
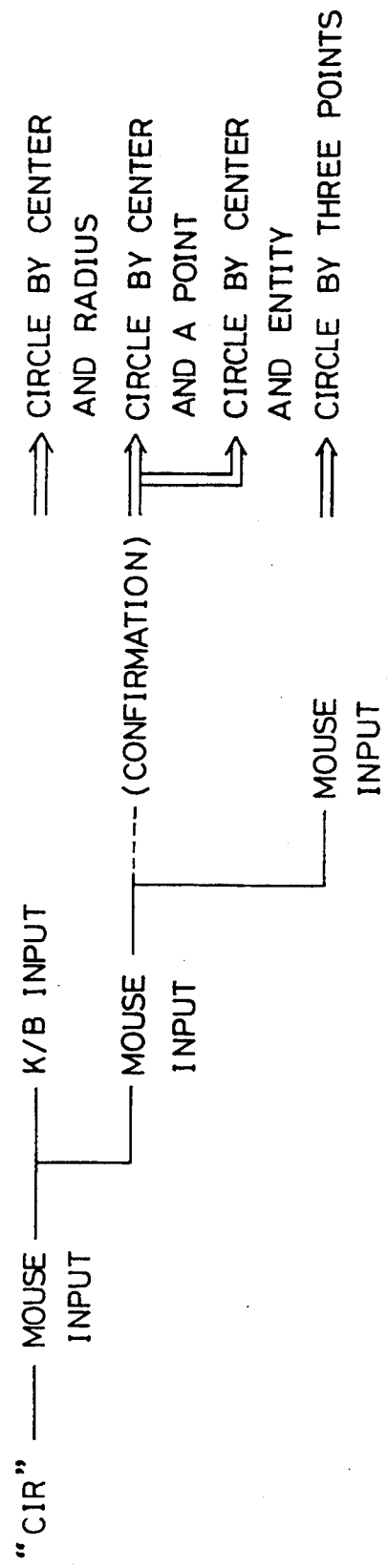
FIG. 19 shows the hierarchical tree structure "CIR" based on the first preferred embodiment of the integrated command.

The features of the integrated command will be apparent from a hierarchical tree structure of the integrated command CIR as shown in FIG. 19. The tree structure is conforming to regulations for interpreting the parameter of the integrated command. This tree structure starts always from a command name. The number of branches from the ancestor is equivalent to the number of descendant parameters in the lower layer. The number of layers is equivalent to the maximum number of parameters to be entered.

FIG. 19 describes the hierarchical tree structure of the integrated command CIR. Concerning the first parameter, a branch should not occur because all four of the commands requires "coordinates" and the first parameter should be entered from a mouse. Concerning the second parameter, "values", "entity" and "coordinates" are available. The tree structure branches to "keyboard input" and "mouse input". If the second parameter is entered by keyboard, the leaf will be found. The basic command "circle by center and radiums" corresponds to the leaf and ends the branch. On the contrary, if the second parameter is entered by mouse, there are two paths. One is to an end branch and another is to additional branches. That is to say;

(1) When input of a parameter ends at the second parameter, it correspond to either of two basic commands, "circle by a center and an entity" or "circle by a center and a point".

(2) When the third parameter is entered, it correspond to "circle by three dots".

The operation for the integrated command CIR will be explained hereinafter.

First of all, the operation for the integrated command CIR will be explained referring to FIG. 19.

Since there is no branch at the input stage for both command name and the first parameter, the operation is same as the one of four basic commands. The operation will change at the stage of the second parameter.

When "numeric values" is entered at the second parameter, it branches to "keyboard input". This is the leaf of this branch and branch operation can not be executed any farther. (As previously noted, the terminal of a branch like this is called a "leaf".) The basic command which corresponds to this leaf is only "circle by center and radius" which requires a radius at the second parameter. The basic command thus so is confirmed as the only executable command.

In the case that, a "mouse input" is made, there are three options. Two options are "circle by a center and a point" and "circle by a center and an entity" at leaves of branch. Third option is to enter the third coordinates. That is, a basic command has not yet been confirmed.

In case that "mouse input" was taken at the second parameter there are two options;

(1) Executing a command with first and second parameters or entering the third one?

(2) Treating the second input as an element or a coordinate in case of executing with first and the second parameters?

When an integrated command has these plural options, the following procedure is taken.

When a certain parameter is entered, and if both of the executable basic commands at this stage and the basic command requiring the next parameter are existing, the executable basic command is temporarily executed. It then waits for the next parameter input. This stage can be called "temporary confirmed execution". It is still possible to change the command at tills stage. If the execution result is as expected, "confirmation" should be indicated. If an operator wants to enter the next parameter, he can continue to enter.

Figure 20:
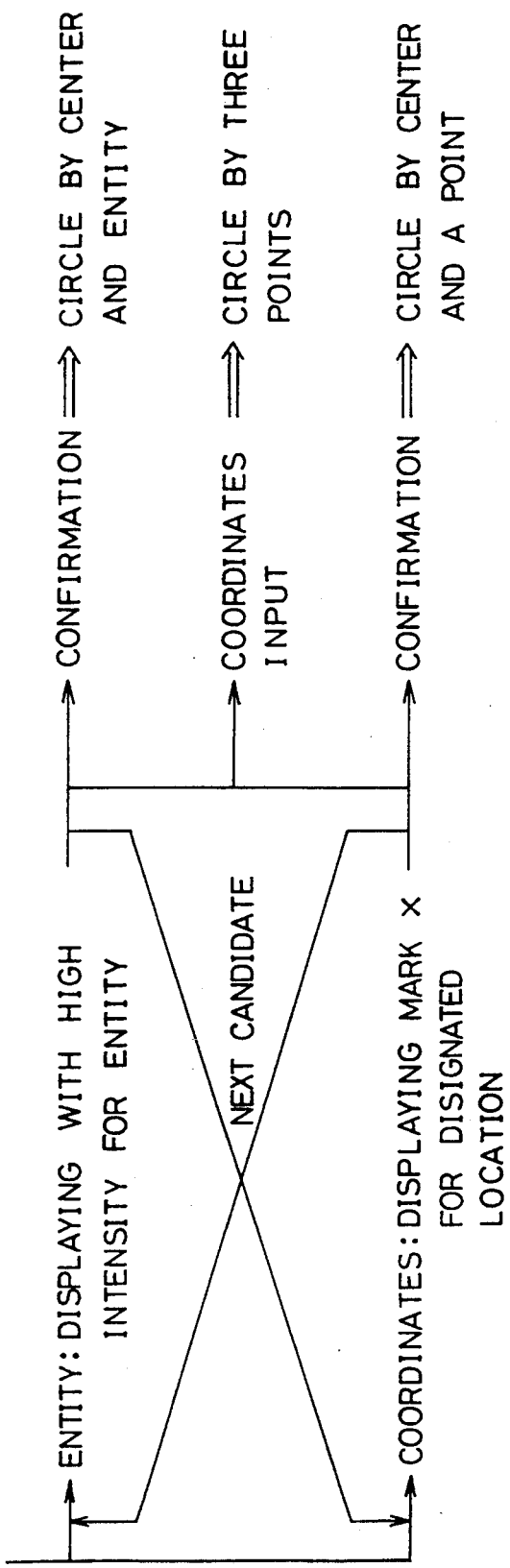
FIG. 20 shows the work after "mouse input" at the second parameter of CIR based on the first preferred embodiment of the integrated command.
Figure 21:
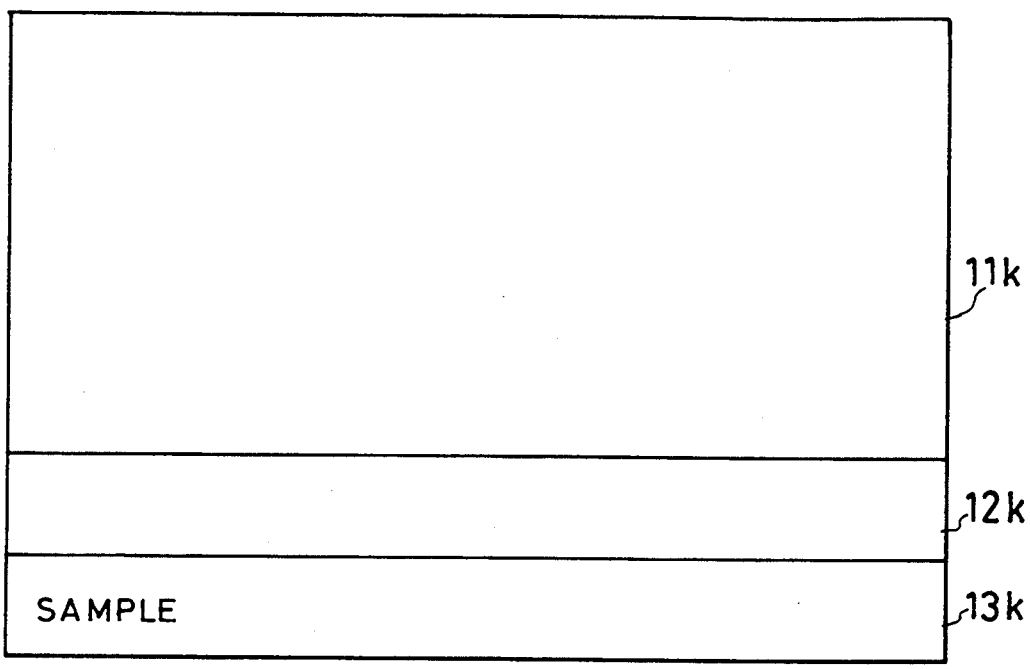
FIG. 21 shows the operation procedures based on the second preferred embodiment of the integrated command.

If there are plural executable basic commands, one basic command out of the executable basic commands is temporarily executed. And It also waits the next parameter input. This stage can be also called "temporary confirmed execution". It is possible to change command at this stage. If the execution result is as expected, "confirmation" should be entered. If the operator wants to execute the other basic command, "next candidate" should be entered. The selecting operation for "next candidate" can be operated repeatedly. FIG. 20 shows the status when this repeated operation is applied at the stage of the input of the second parameter of the integrated command CIR.

As has been explained in the foregoing, the integrated command combines one or more basic commands into a new integrated command. The features and advantages of this integrated command brings the following effects.

(1) Satisfaction is given to user of a menu guide system.

The command operation can be formed into a hierarchical tree structure by integrating plural commands, so that the operation is similar to a menu guide system.

(2) The command operation is improved by simplification.

The operator does not need to indicate menus to select the next command when he continuously execute a similar function by the command system. The operator can continue the operation without selecting other commands from menus.

(3) The apparatus can give users better images due to the simplification of menus.

The number of commands is minimized without reducing the numbers of functions.

(4) The operation along with the stream of the operator's thinking is fulfilled.

It is possible to enter parameters from an ambiguous indication to a detailed indication in order along with a stream of operator's thinking.

Embodiment 2.

Embodiment 1 has described how to draw a circle in relation to the integrated commands. It is possible that the integrated command is utilized to draw other graphics such as rectangles. It is also possible to integrate different kinds of basic commands which perform completely different functions though the operation of such integrated command might be far from an optimum user-friendly-operation.

Figure 22:
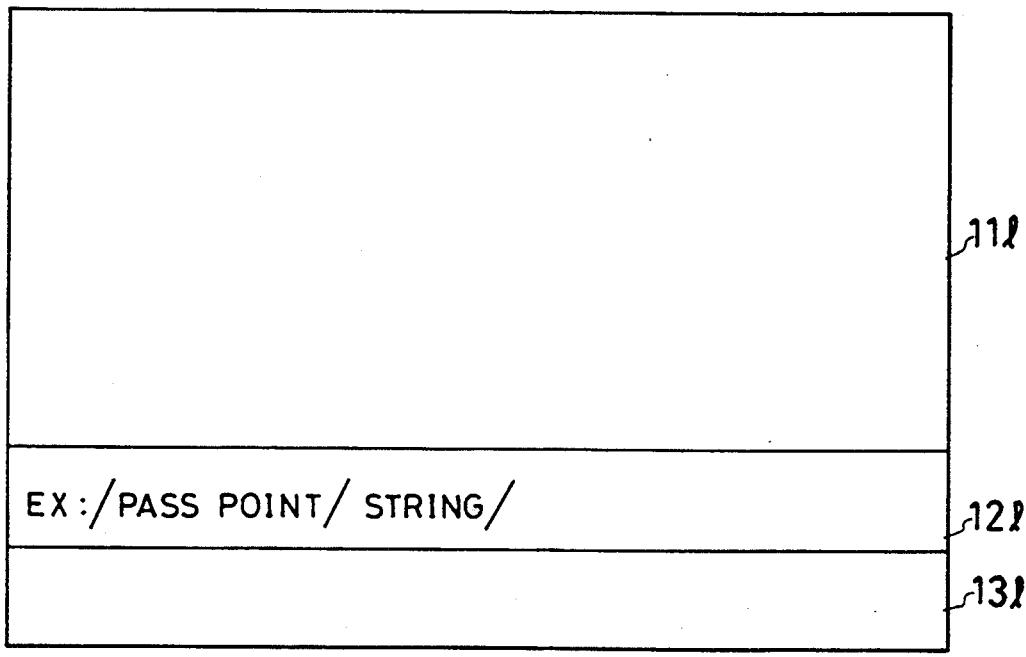
FIG. 22 shows the operation procedures based on the second preferred embodiment of the integrated command.
Figure 23:
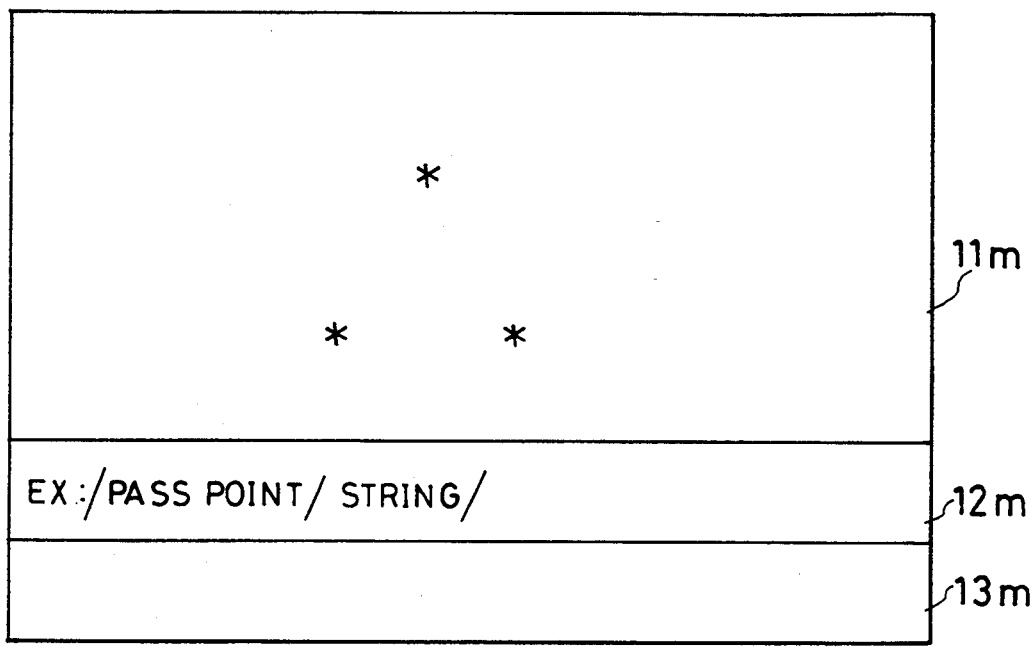
FIG. 23 shows the operation procedures based on the second preferred embodiment of the integrated command.

From FIG. 21 through FIG. 26 show the operation of an integrated command named "SAMPLE" which integrates a line linkage command and a note command. Shown in FIG. 27, is an integrated command "SAMPLE" comprising two basic commands, a line linkage command and a note command. At first, the operator enters the integrated command name in the command input area 13k in FIG. 21. As a result, the first guidance can be shown in the guidance area 121 as illustrated in FIG. 22. The operator enters the location marked "*" in a graphic display area 11m to designate the "pass point" according to the guidance by a coordinates input device such as a mouse, as shown in FIG. 23.

Figure 24:
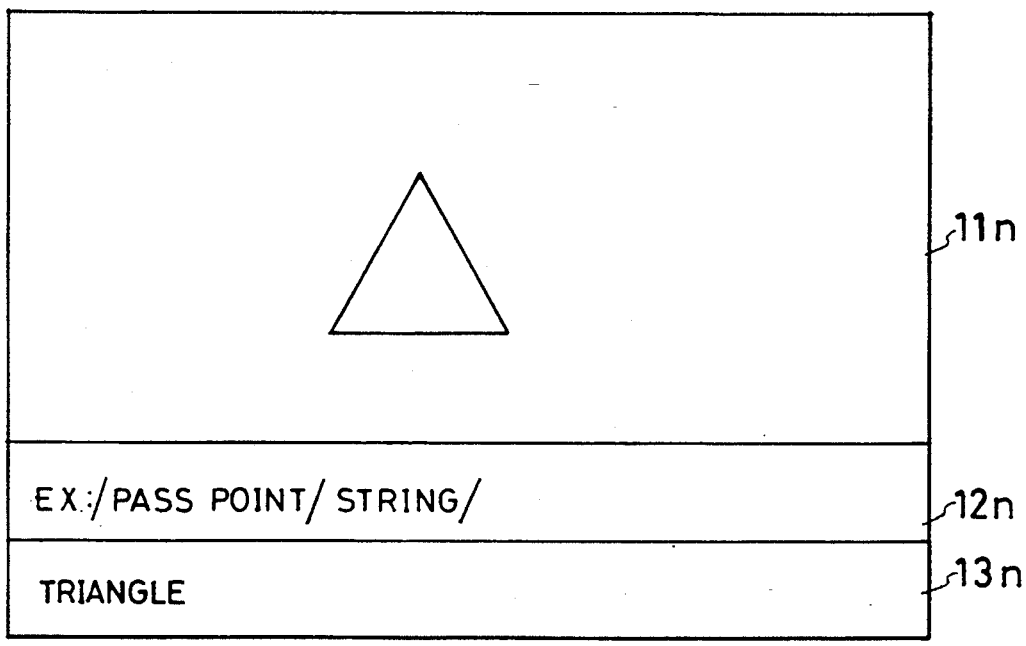
FIG. 24 shows the operation procedures based on the second preferred embodiment of the integrated command.

A "line linkage command", which is a basic command having the coordinates value for the first parameter, will be selected automatically to display a linked line in a graphic display area 11n as shown in FIG. 24. A guidance area 12n shows the guidance of the first parameter once again so as to execute repetitive operations for commands.

Figure 25:
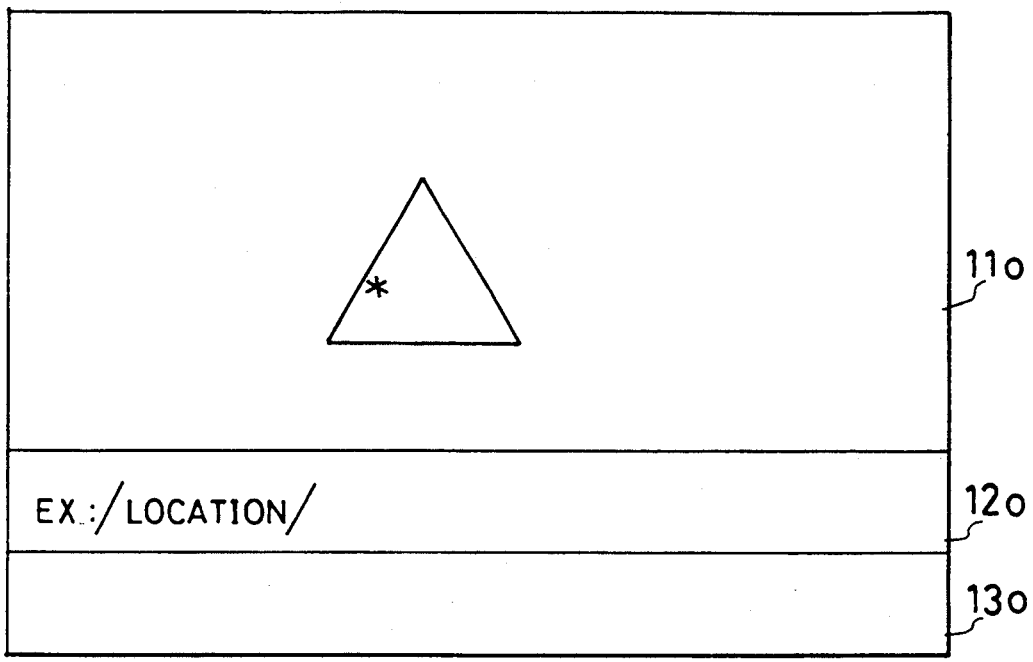
FIG. 25 shows the operation procedures based on the second preferred embodiment of the integrated command.

Without entering another command in this stage, a character string "triangle" is entered in a command area 13n. A note command can be now automatically selected to display the guidance of the second parameter for a note command in a guidance area 12o as shown in FIG. 25. Enter the location of a graphic in a graphic display area 11o according to the guidance.

Figure 26:
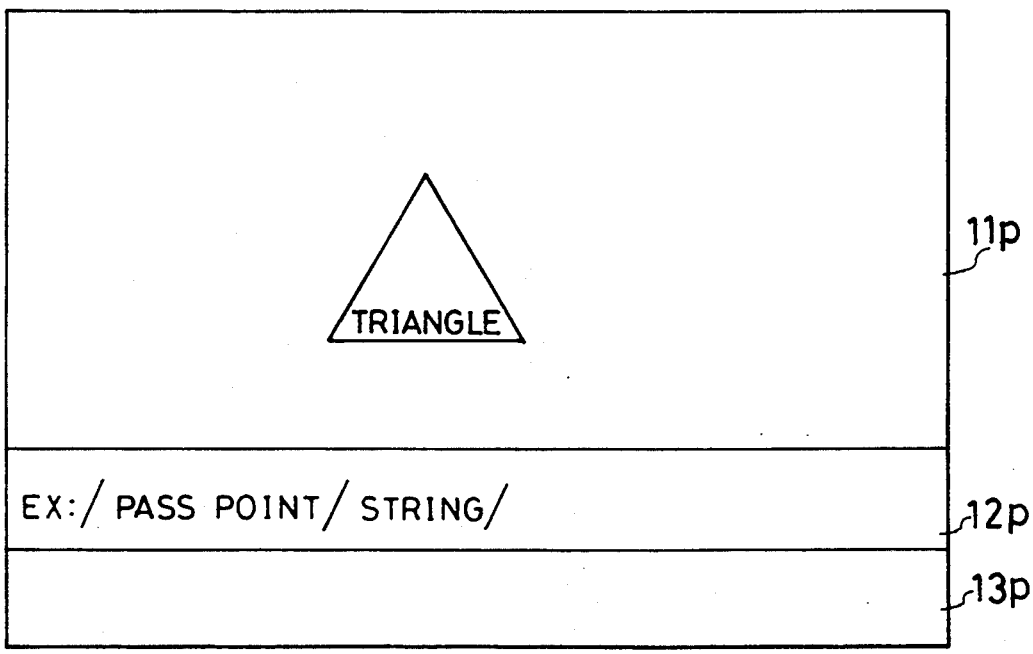
FIG. 26 shows the operation procedures based on the second preferred embodiment of the integrated command.

As a result, a character string "triangle" will be shown in a graphic display area 11p, as shown in FIG. 26.

As just stated, the integrated command integrates the functions of the plural basic commands without any effect. Therefore the effective input operation can be achieved by integrating the basic commands. If the integrated basic command has a capability of a continuous repeat operation, a more effective operation can be achieved.

Embodiment 3

Automatic branch by the operation of the integrated command, will now be explained referring flow charts.

Figure 29:
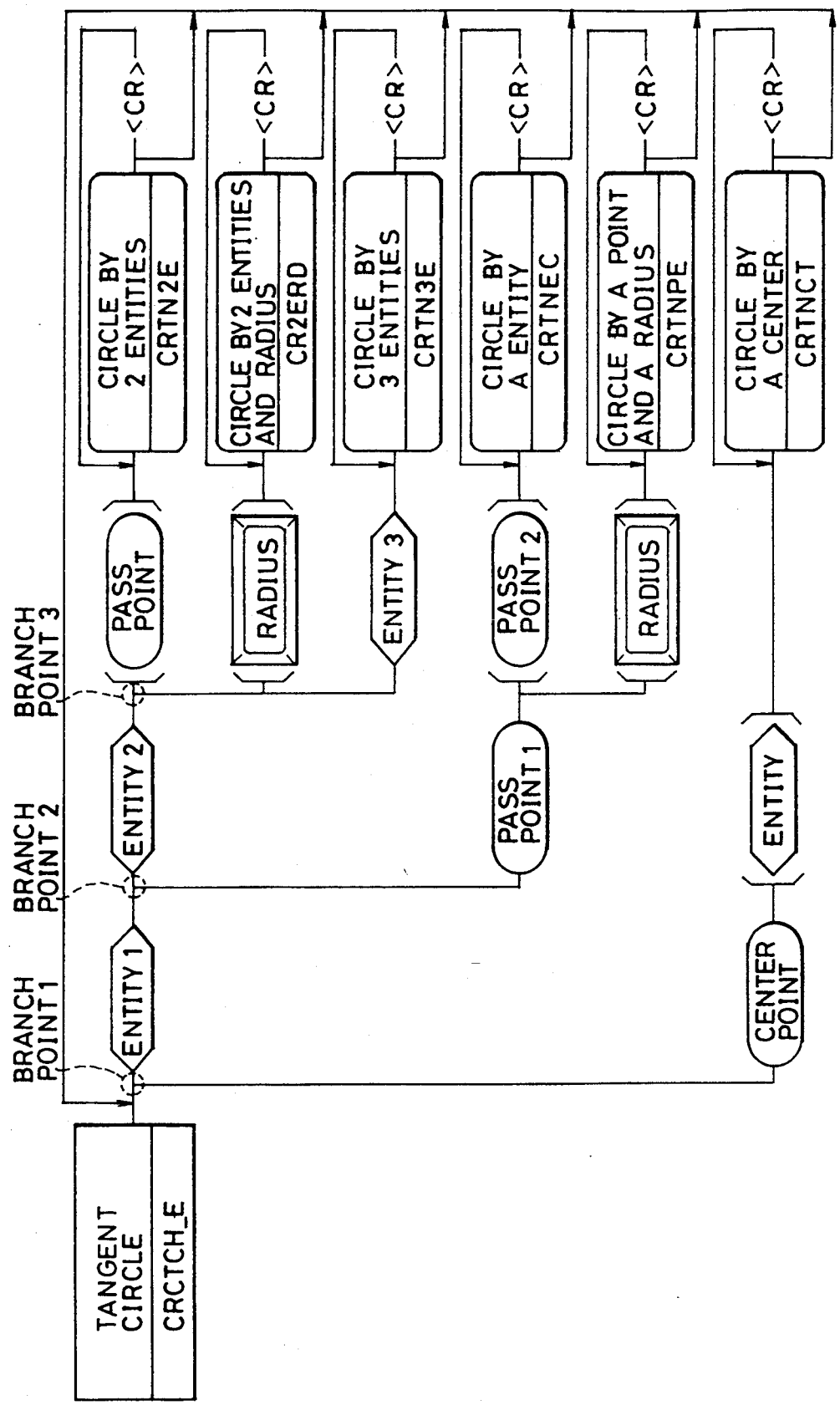
FIG. 29 shows the flow chart for the command "tangent circle" based on the third preferred embodiment of the integrated command.

The symbols to be used in the following Figures are explained as in FIG. 28. In this embodiment, a basic command called "circle by two entities" is selected and executed from the integrated command called "tangent circle". The "tangent circle" command (CRCTCH_E) is defined as the integrated command combining the following six basic commands as illustrated in FIG. 29.

circle by two entities (CRTN2E)
circle by two entities and radius (CR2ERD)
circle by three entities (CRTN3E)
circle by entity (CRTNEC)
circle by a point and a radius (CRTNPE)
circle by a center (CRTNCT)

FIG. 30 through FIG. 39 show the operation procedure. In these Figures, the screen 100 has a graphic display area 11, a guidance area 12, a command area 13, and a menu area 14.

The operation procedures will be described referring each Figure hereinafter.

Figure 30:
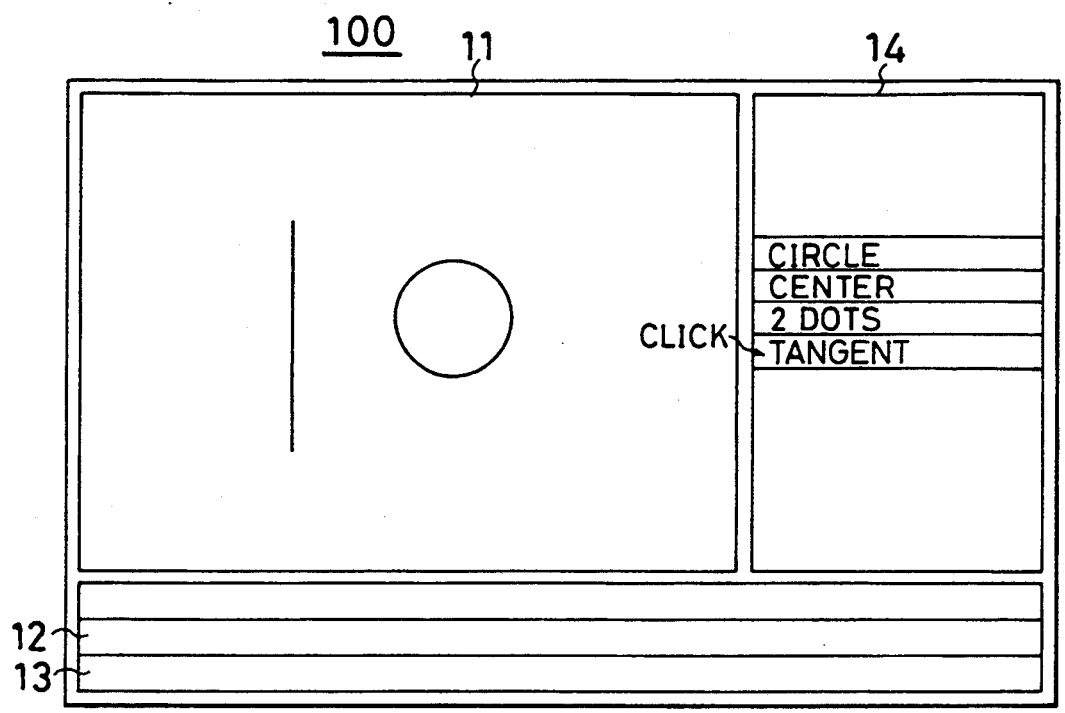
FIG. 30 shows the operation procedures for the command "tangent circle" based on the third preferred embodiment of the integrated command.

FIG. 30: Select "tangent circle" command out of menu.

Figure 31:
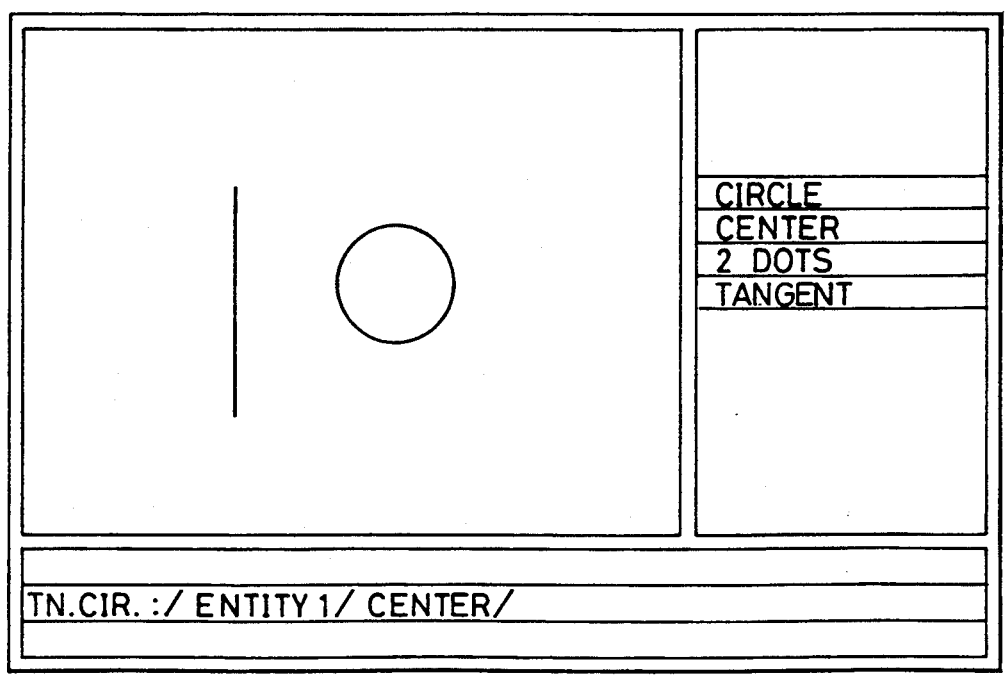
FIG. 31 shows the operation procedures for the command "tangent circle" based on the third preferred embodiment of the integrated command.

FIG. 31: The guidance of the first parameter of the integrated command will be displayed (branch point 1 in FIG. 29).

Figure 32:
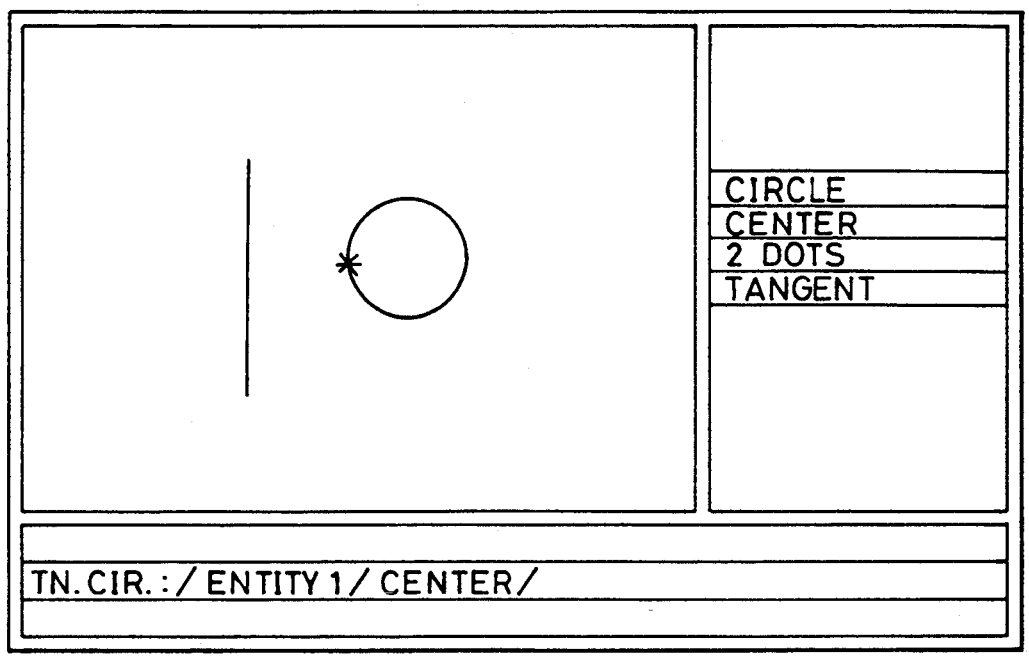
FIG. 32 shows the operation procedures for the command "tangent circle" based on the third preferred embodiment of the integrated command.

FIG. 32: Enter one dot from coordinates input device (locator), such as a mouse or a tablet. It is judged that entity 1 is entered because an entity has been picked.

Figure 33:
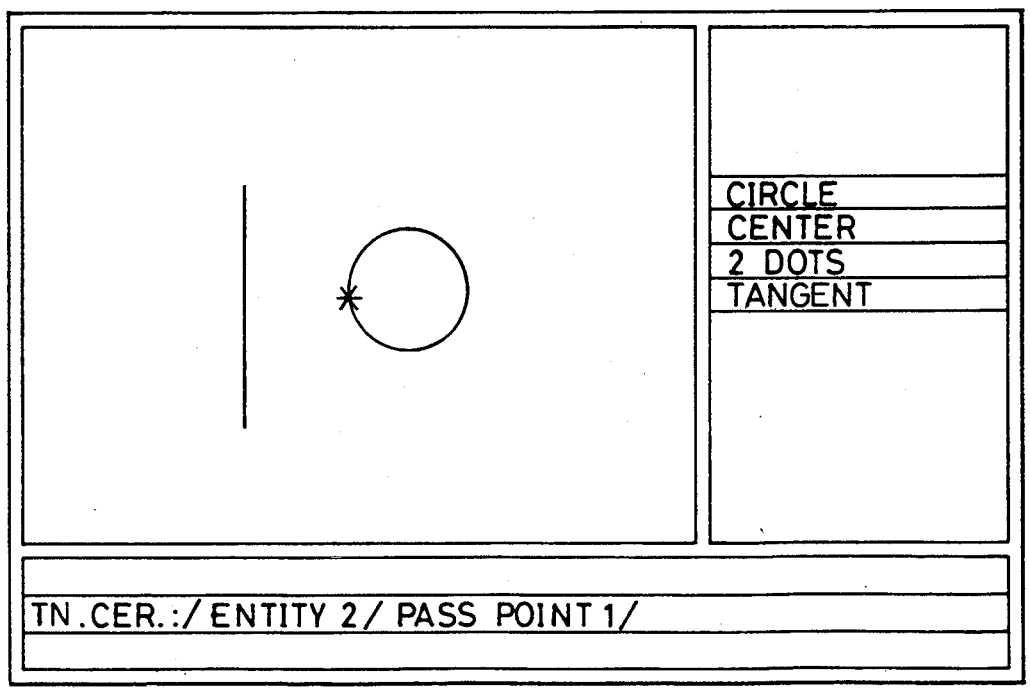
FIG. 33 shows the operation procedures for the command "tangent circle" based on the third preferred embodiment of the integrated command.

FIG. 33: The commands, in which the first parameter is entity 1, are selected as the candidate commands out of six basic commands integrated to "tangent circle". The candidate commands are:

Circle by two entities,
Circle by two entitles and radius,
Circle by three entities,
Circle by a entity, and
Circle by a point and a radius.

At the same time the guidance showing second parameters for those five candidate commands are displayed (branch point 2 in FIG. 29).

Figure 34:
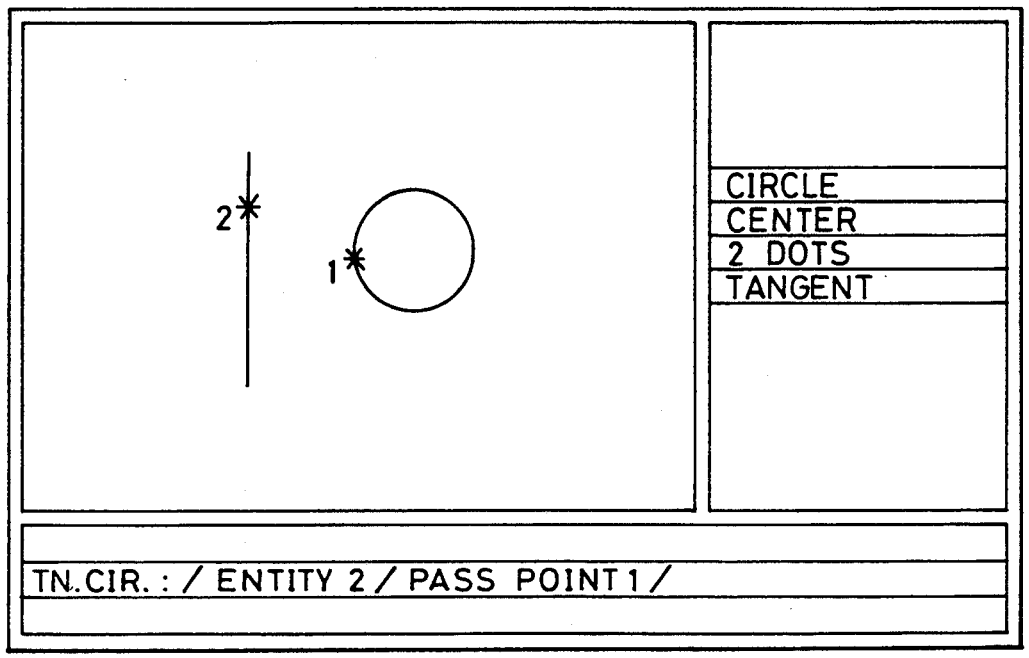
FIG. 34 shows the operation procedures for the command "tangent circle" based on the third preferred embodiment of the integrated command.

FIG. 34: Enter another dot from a locator. It is Judged that entity 2 is entered because a entity has been picked.

Figure 35:
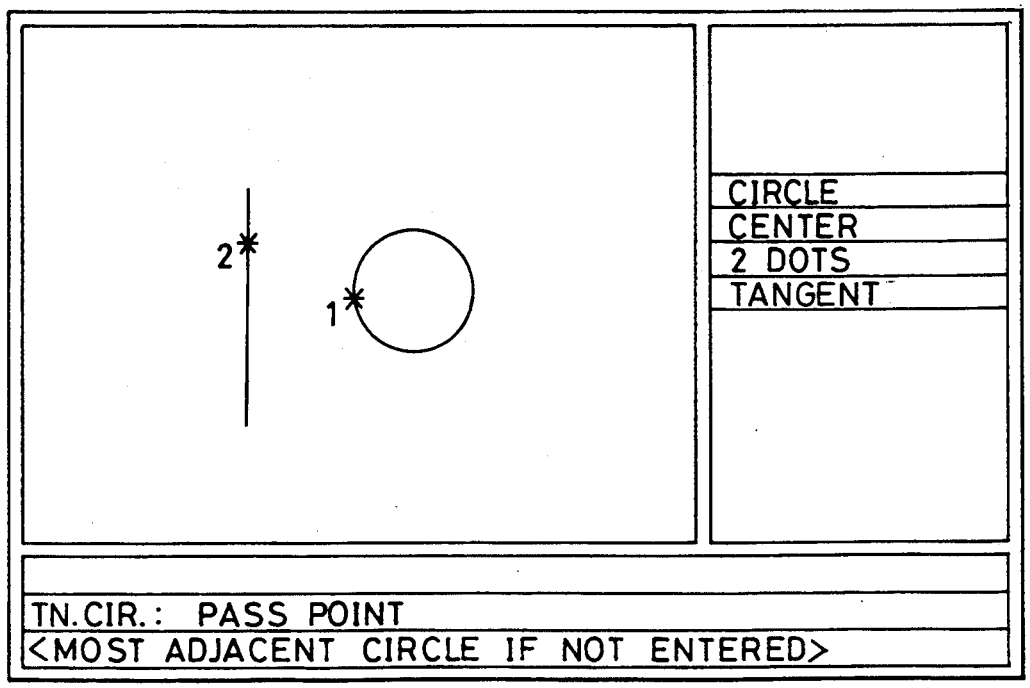
FIG. 35 shows the operation procedures for the command "tangent circle" based on the third preferred embodiment of the integrated command.

FIG. 35: The commands, in which the first parameter is entity 1, and the second parameter is entity 2, are selected as the new candidate commands out of five candidate commands. The new candidate commands are:

Circle by two entities,
Circle by two entitles and radius, and
Circle by three entities.

At the same time the guidance showing third parameters for those three commands are displayed (branch point 3).

Figure 36:
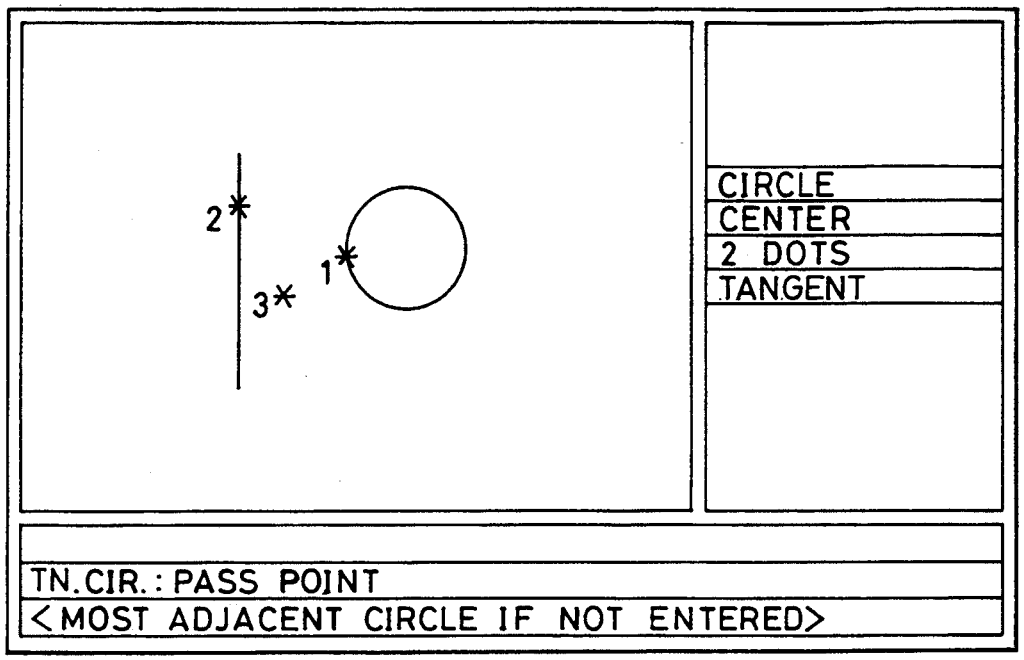
FIG. 36 shows the operation procedures for the command "tangent circle" based on the third preferred embodiment of the integrated command.

FIG. 36: Enter third dot from a locator. It is judged that pass point is entered because no entity has been picked.

Figure 37:
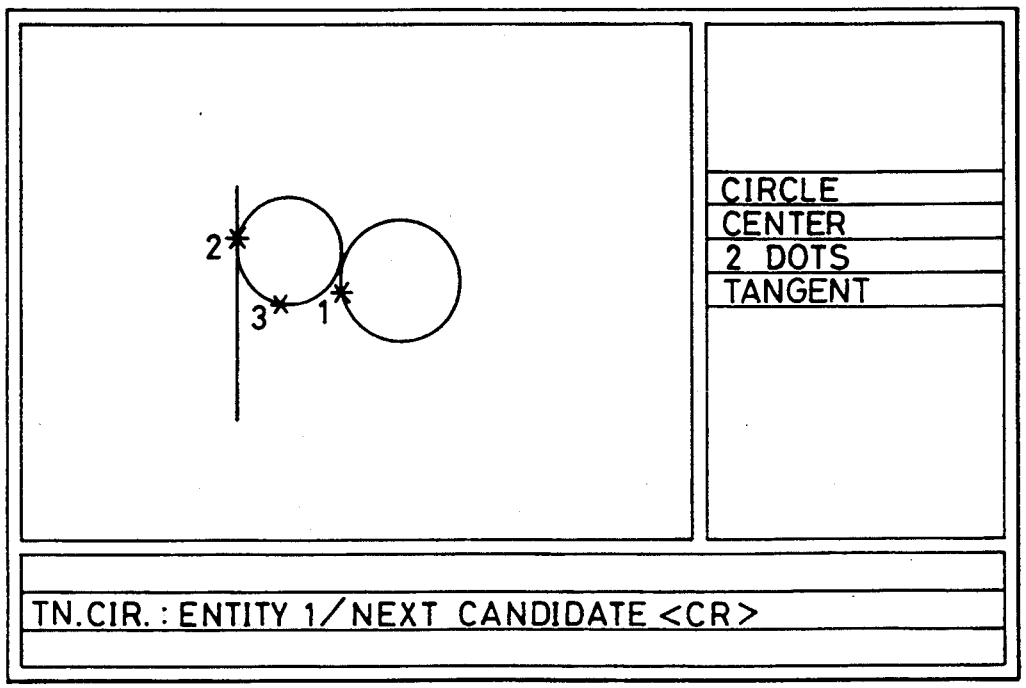
FIG. 37 shows the operation procedures for the command "tangent circle" based on the third preferred embodiment of the integrated command.

FIG. 37: "Circle by two entitles" command is executed resulting in displaying a circle, because only "Circle by two entitles" command has coordinates input as the third parameter. The first displayed circle is a tangent circle with an dot near to an indicated point of entity.

Figure 38:
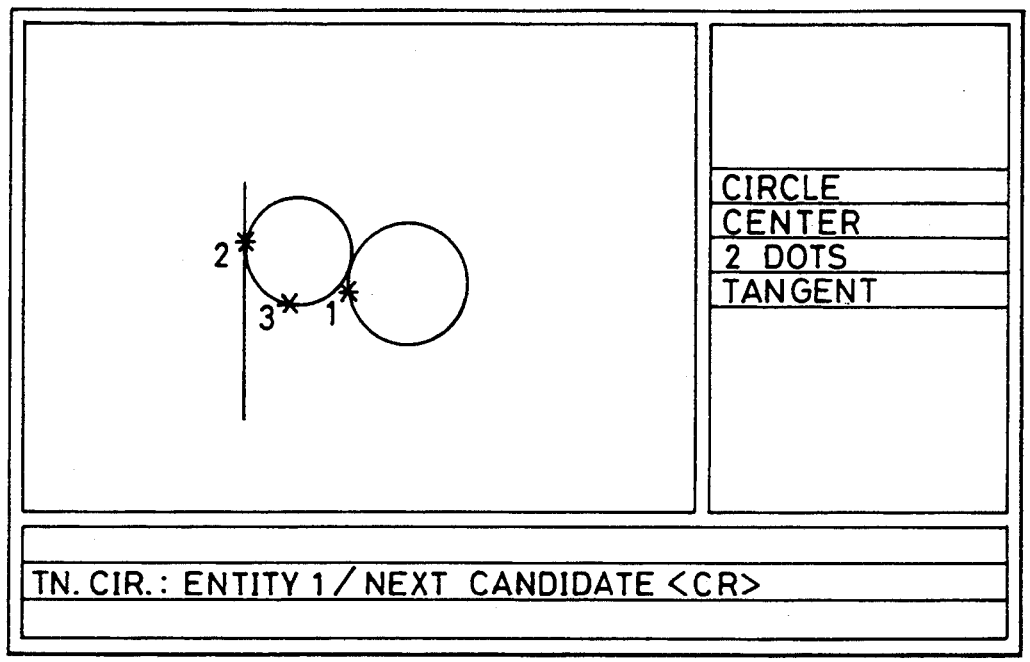
FIG. 38 shows the operation procedures for the command "tangent circle" based on the third preferred embodiment of the integrated command.

FIG. 38: Enter "CR" select the next candidate.

Figure 39:
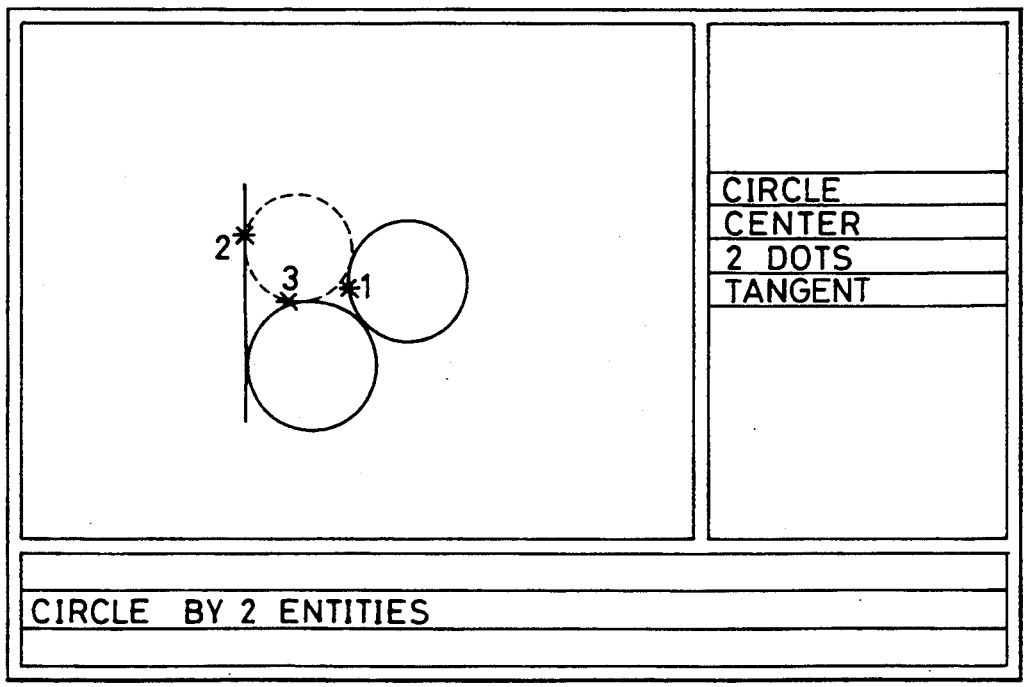
FIG. 39 shows the operation procedures for the command "tangent circle" based on the third preferred embodiment of the integrated command.
Figure 40:
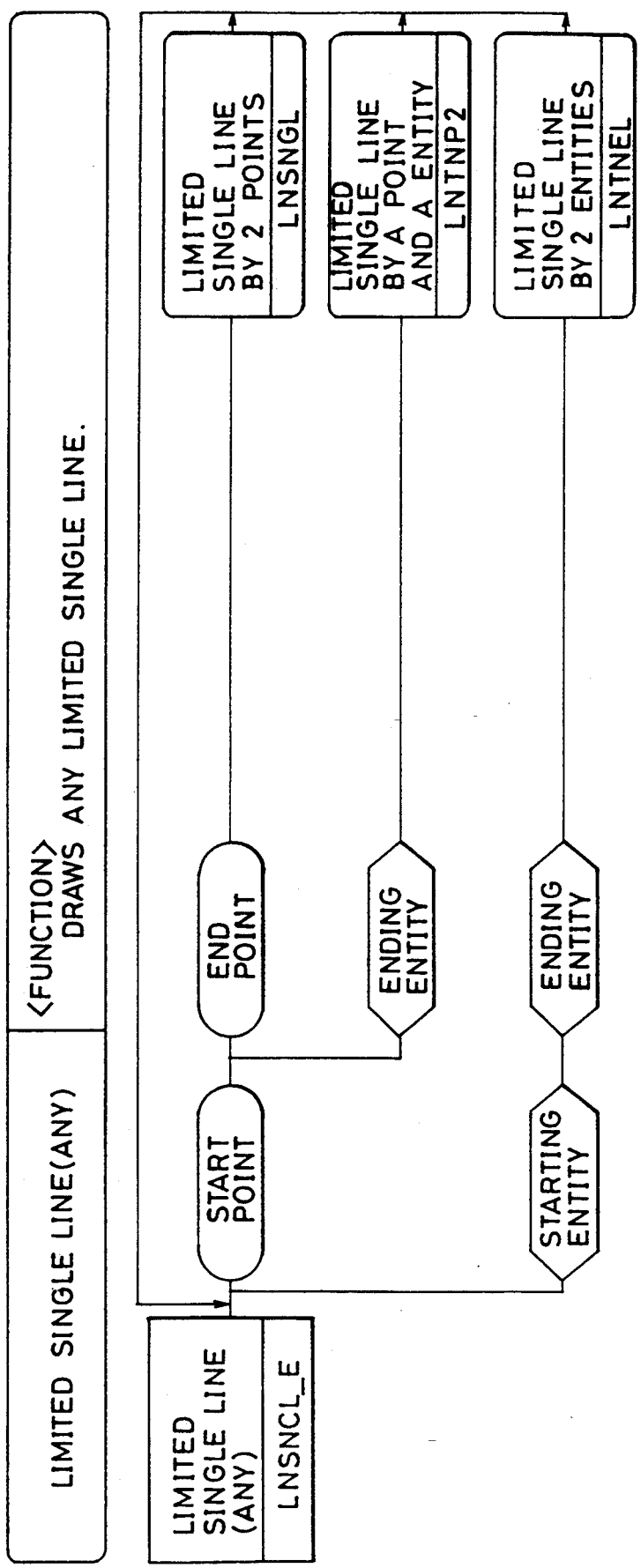
FIG. 40 is a flow chart to show another integrated command.
Figure 41:
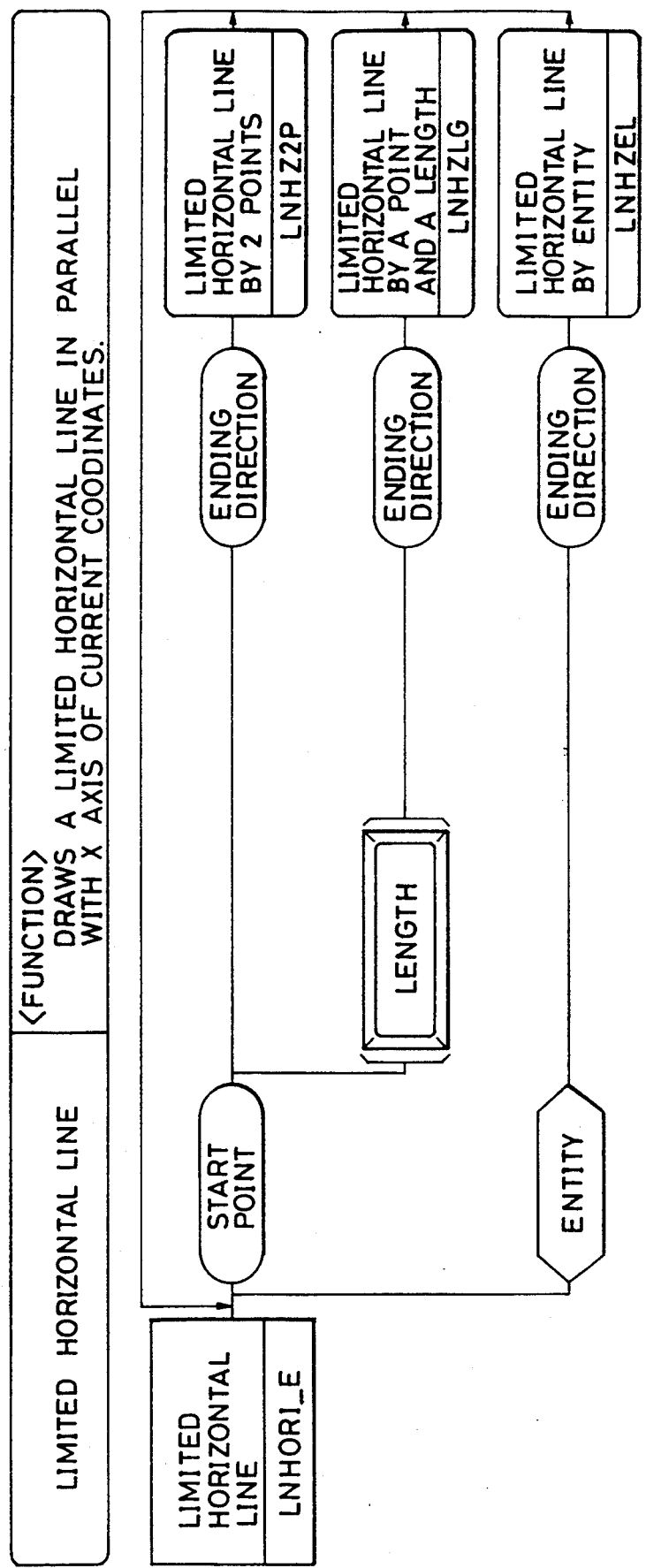
FIG. 41 is a flow chart to show another integrated command.
Figure 42:
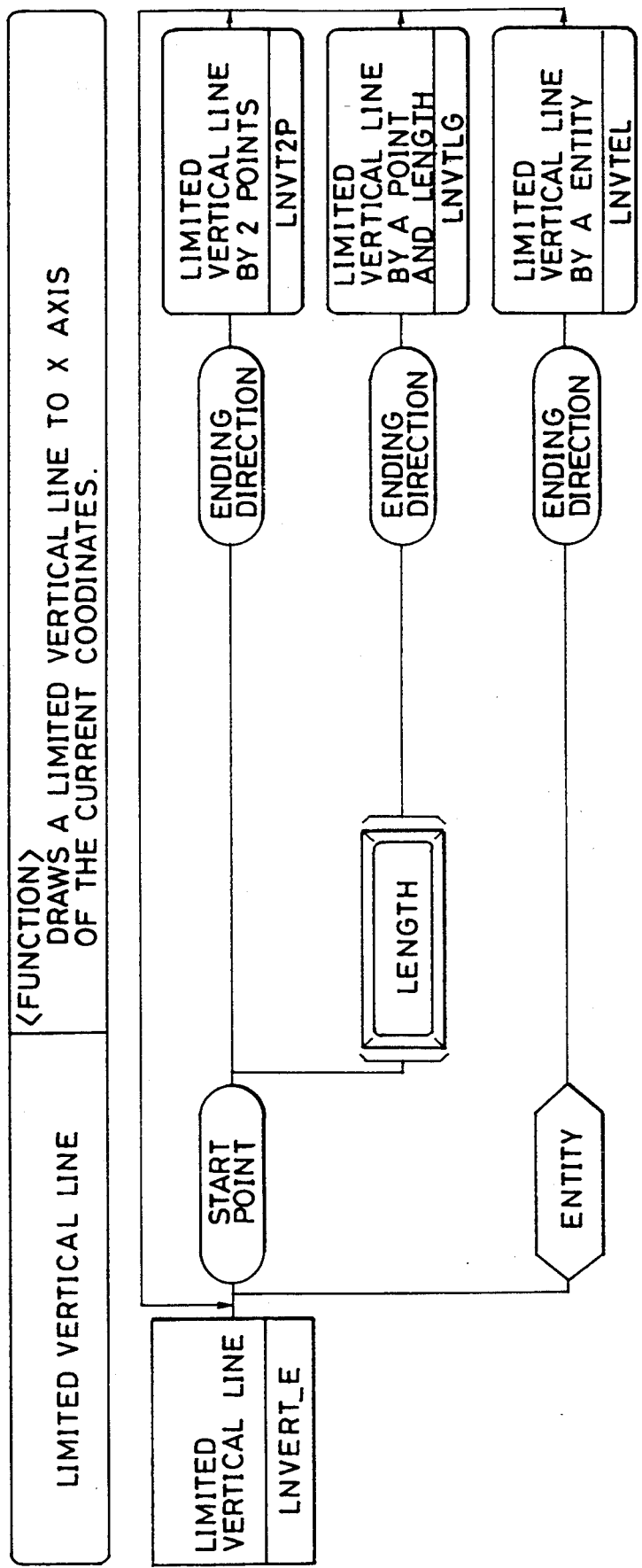
FIG. 42 is a flow chart to show another integrated command.
Figure 43:
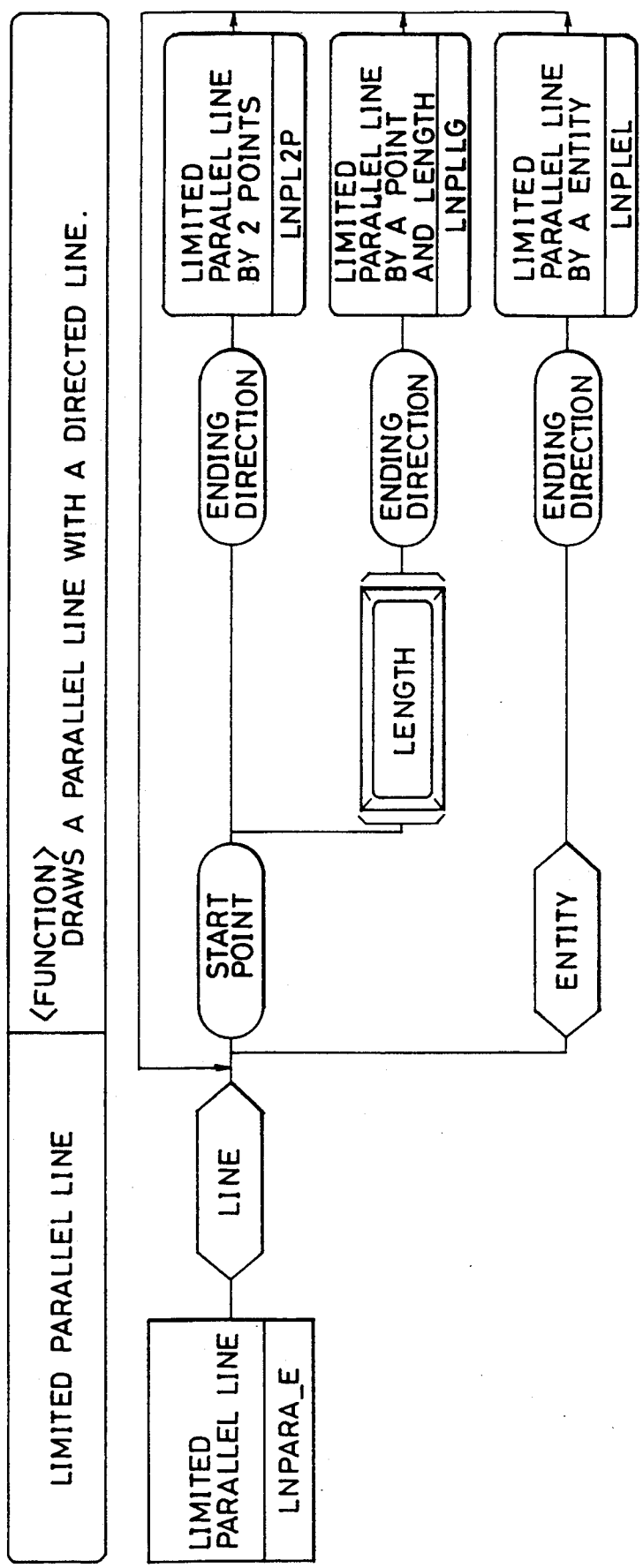
FIG. 43 is a flow chart to show another integrated command.
Figure 44:
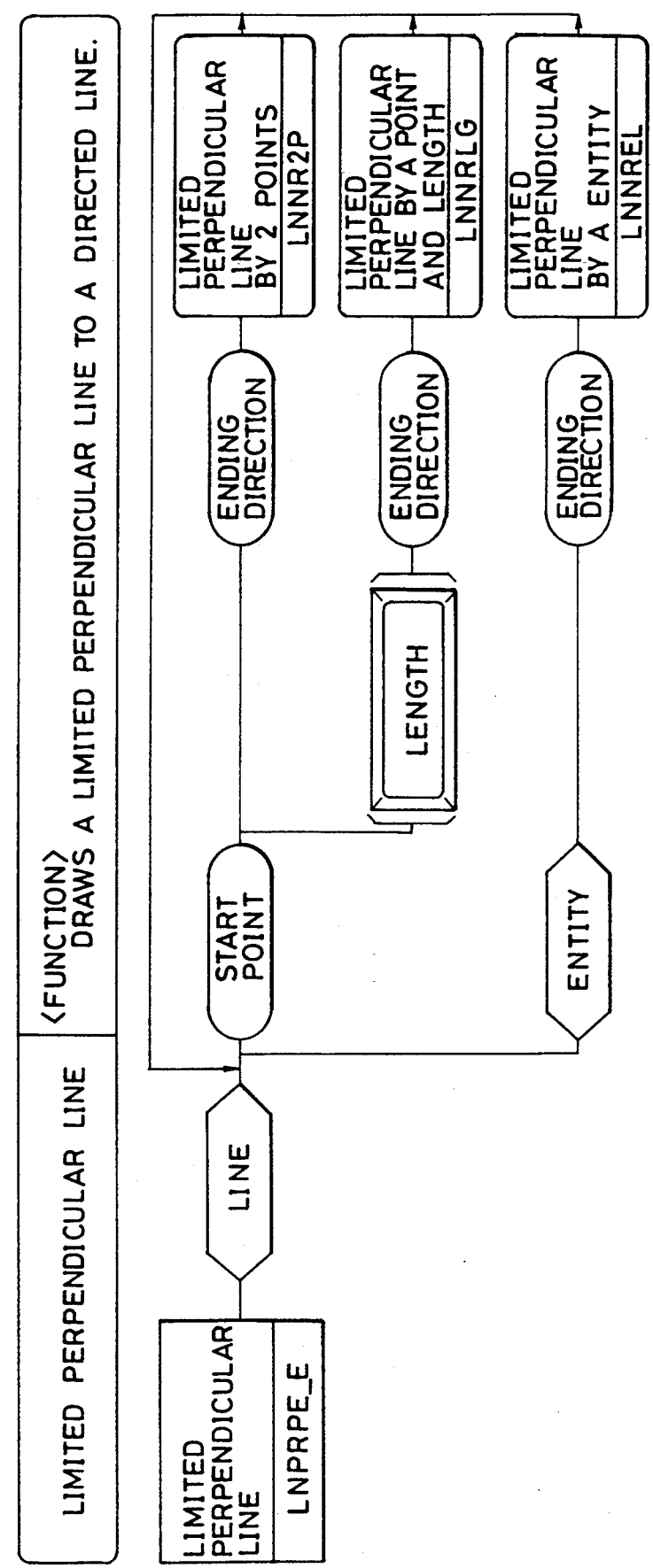
FIG. 44 is a flow chart to show another integrated command.
Figure 45:
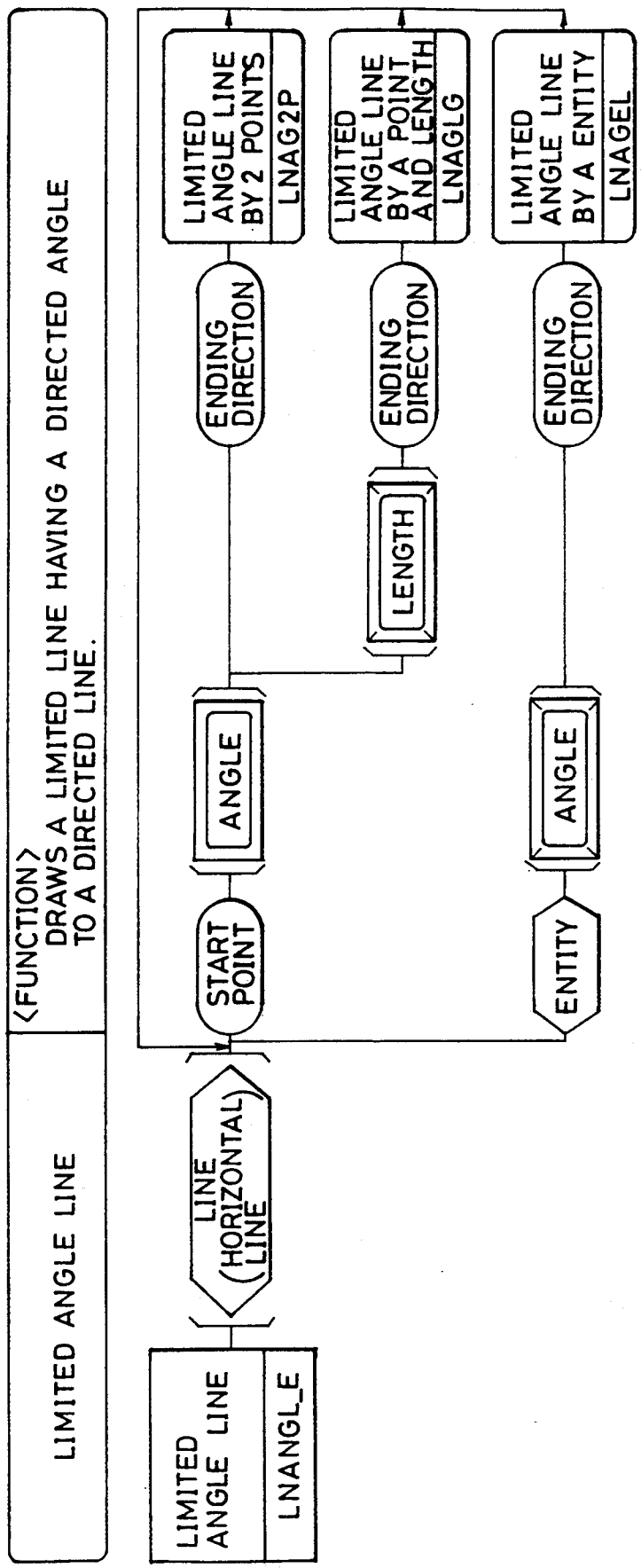
FIG. 45 is a flow chart to show another integrated command.
Figure 46:
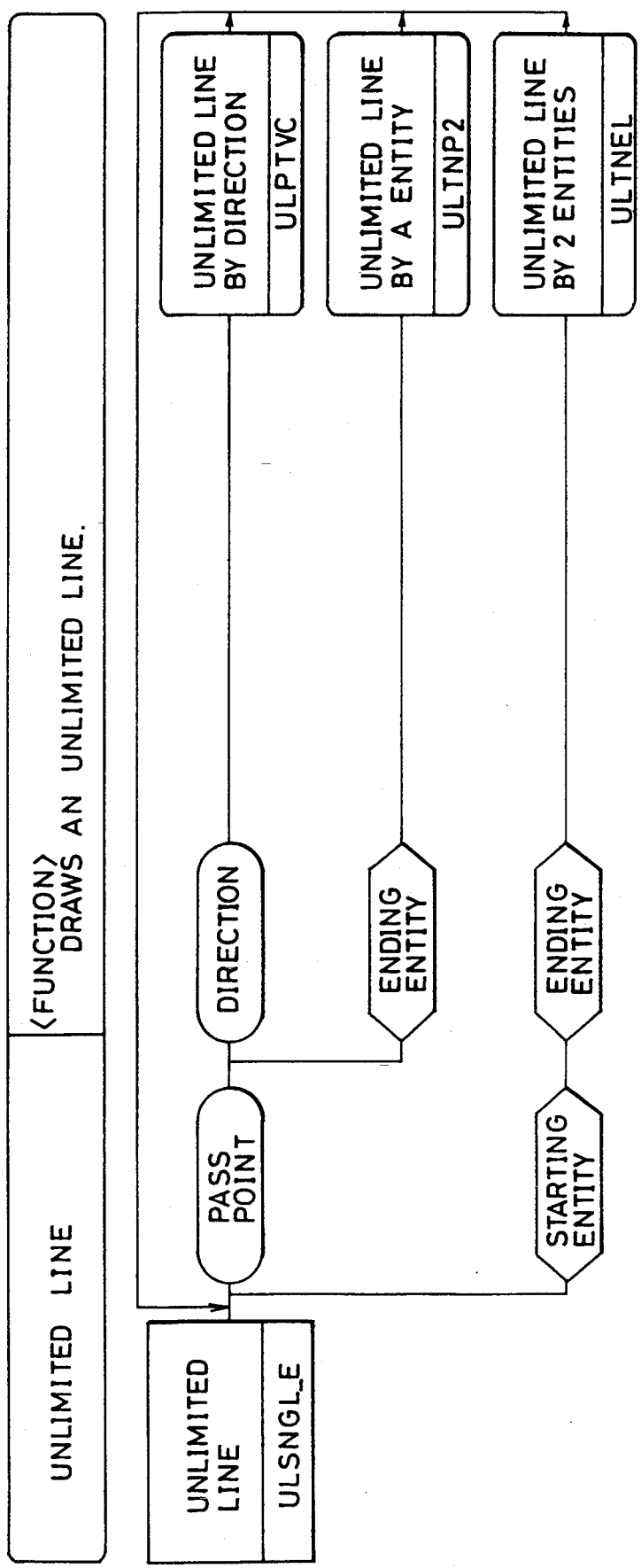
FIG. 46 is a flow chart to show another integrated command.
Figure 47:
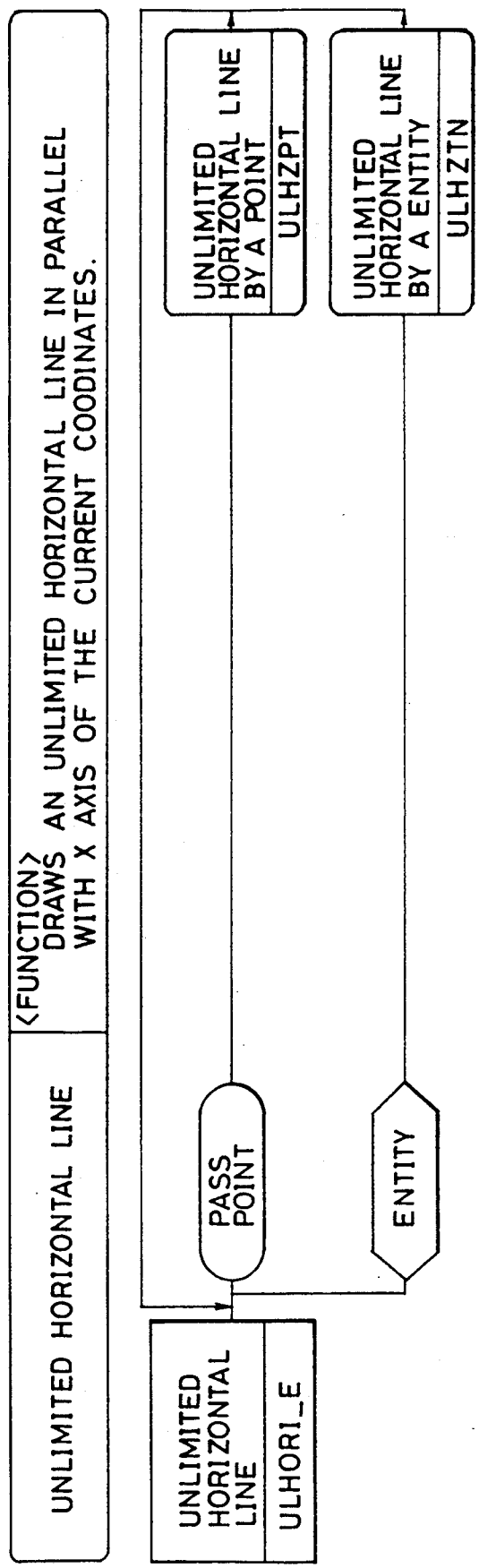
FIG. 47 is a flow chart to show another integrated command.
Figure 48:
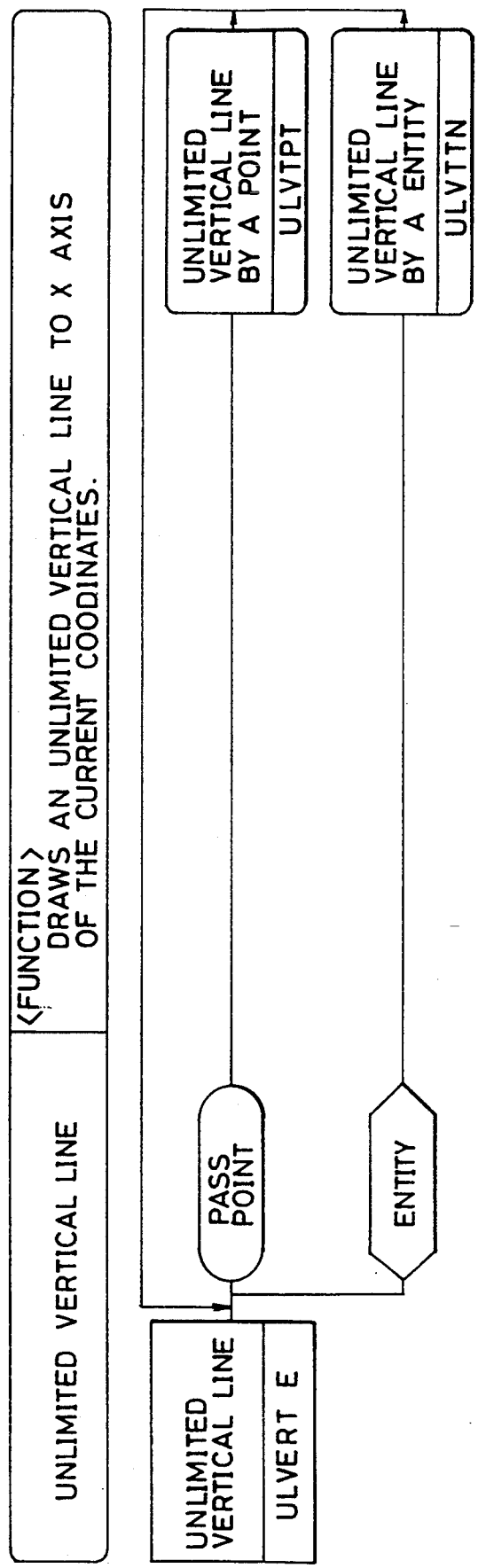
FIG. 48 is a flow chart to show another integrated command.
Figure 49:
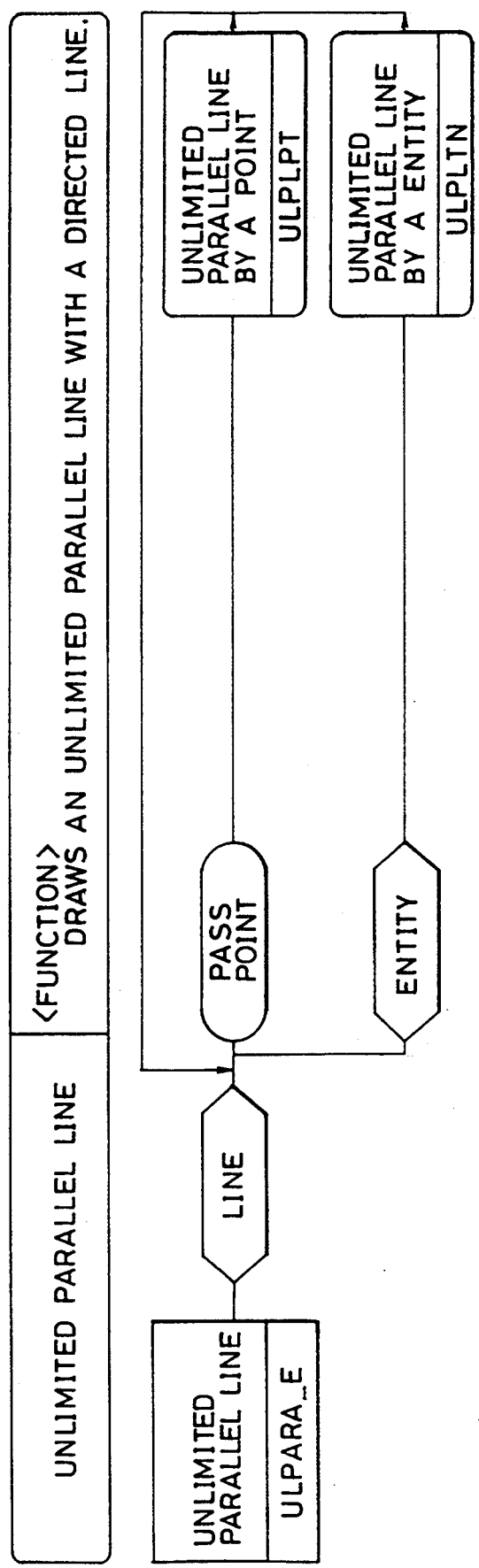
FIG. 49 is a flow chart to show another integrated command.
Figure 50:
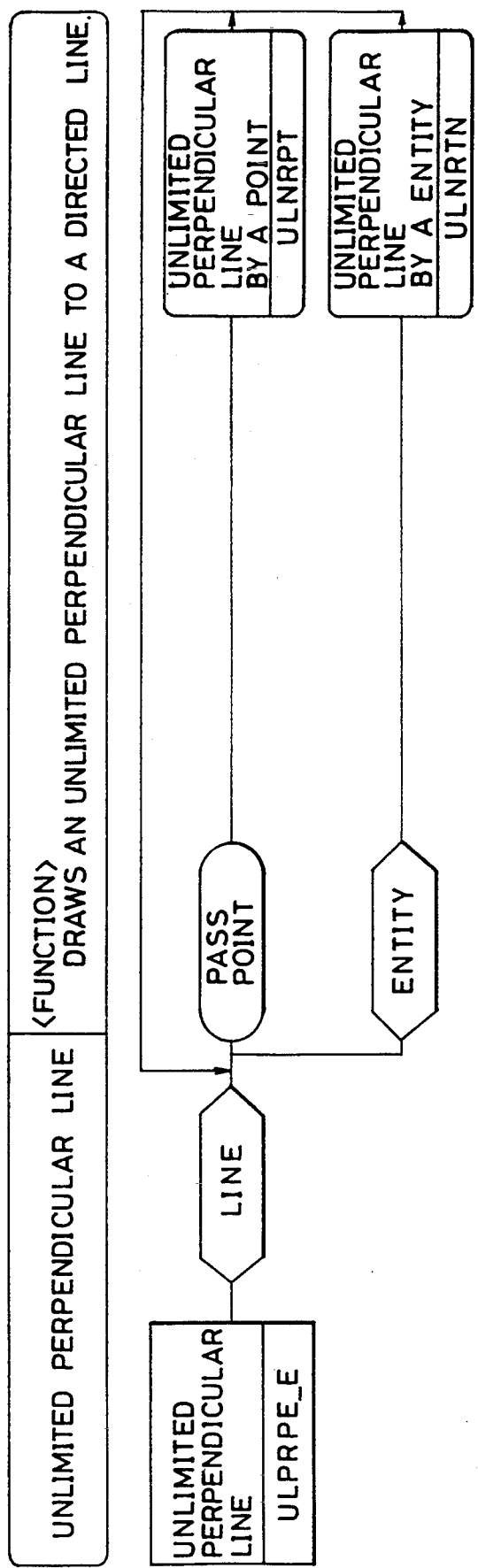
FIG. 50 is a flow chart to show another integrated command.
Figure 51:
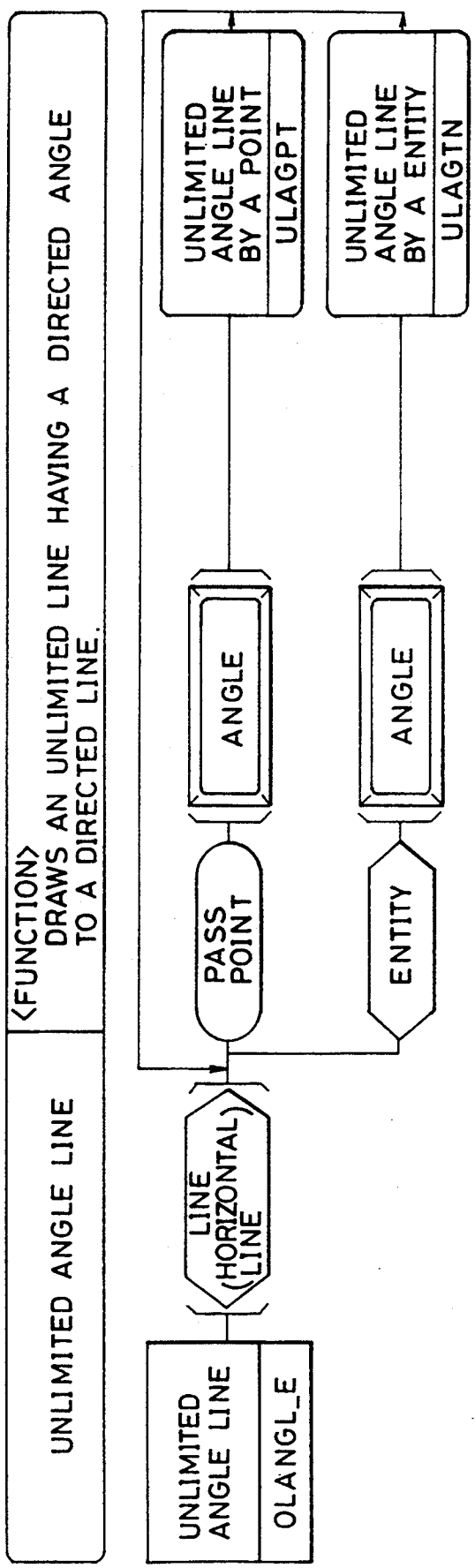
FIG. 51 is a flow chart to show another integrated command.
Figure 52:
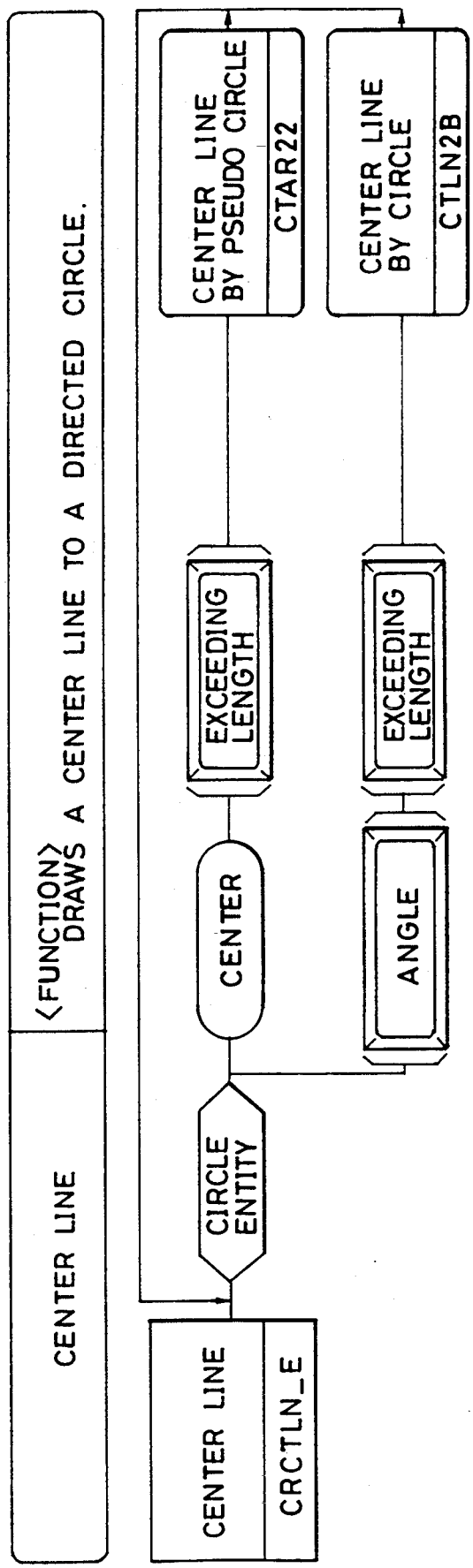
FIG. 52 is a flow chart to show another integrated command.
Figure 53:
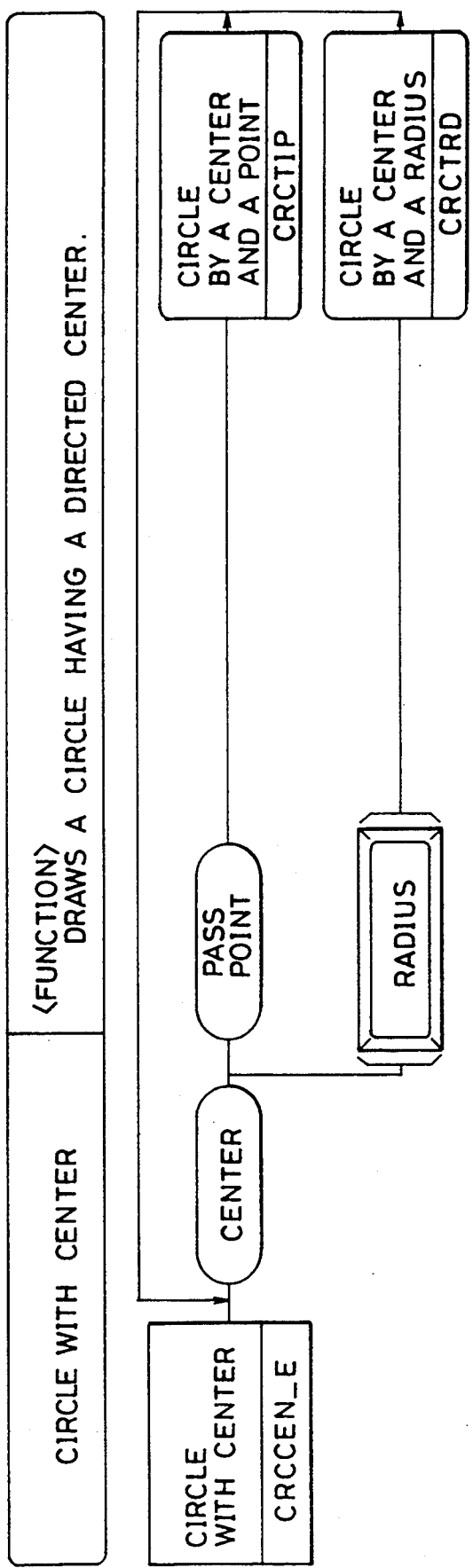
FIG. 53 is a flow chart to show another integrated command.
Figure 54:
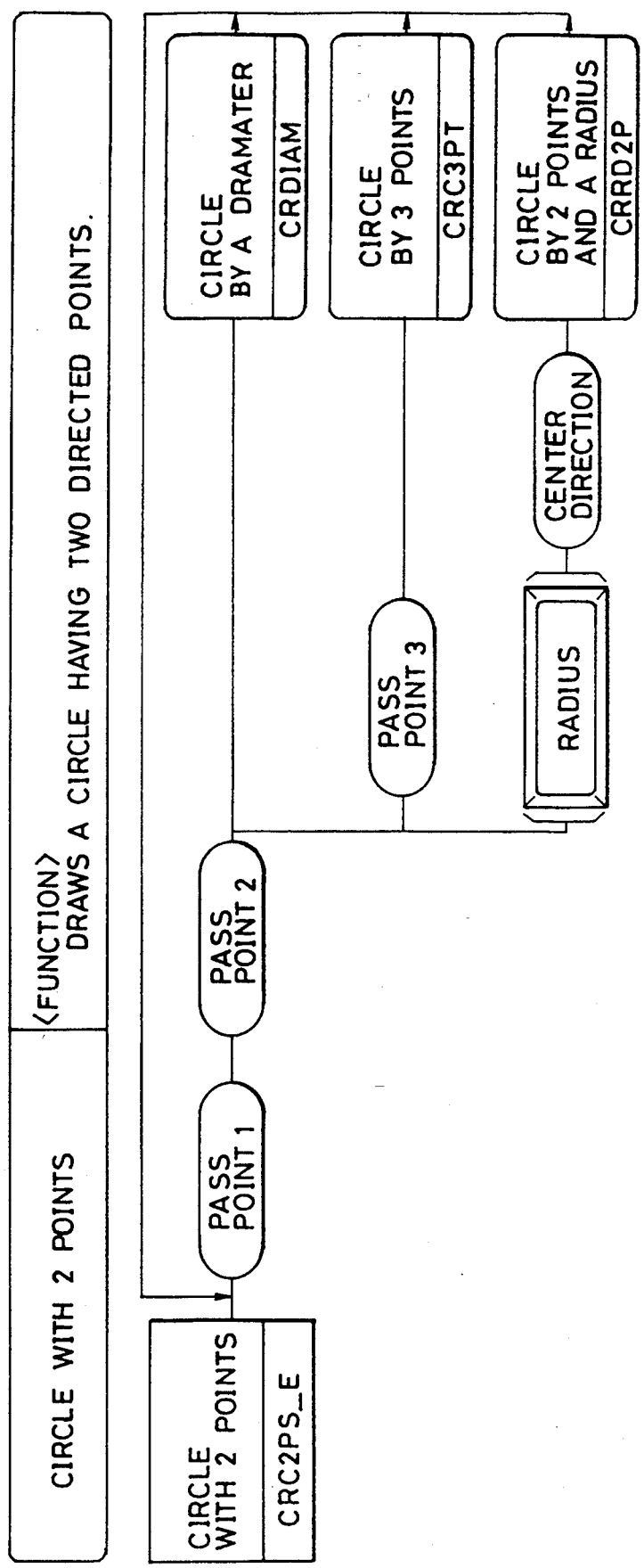
FIG. 54 is a flow chart to show another integrated command.
Figure 55:
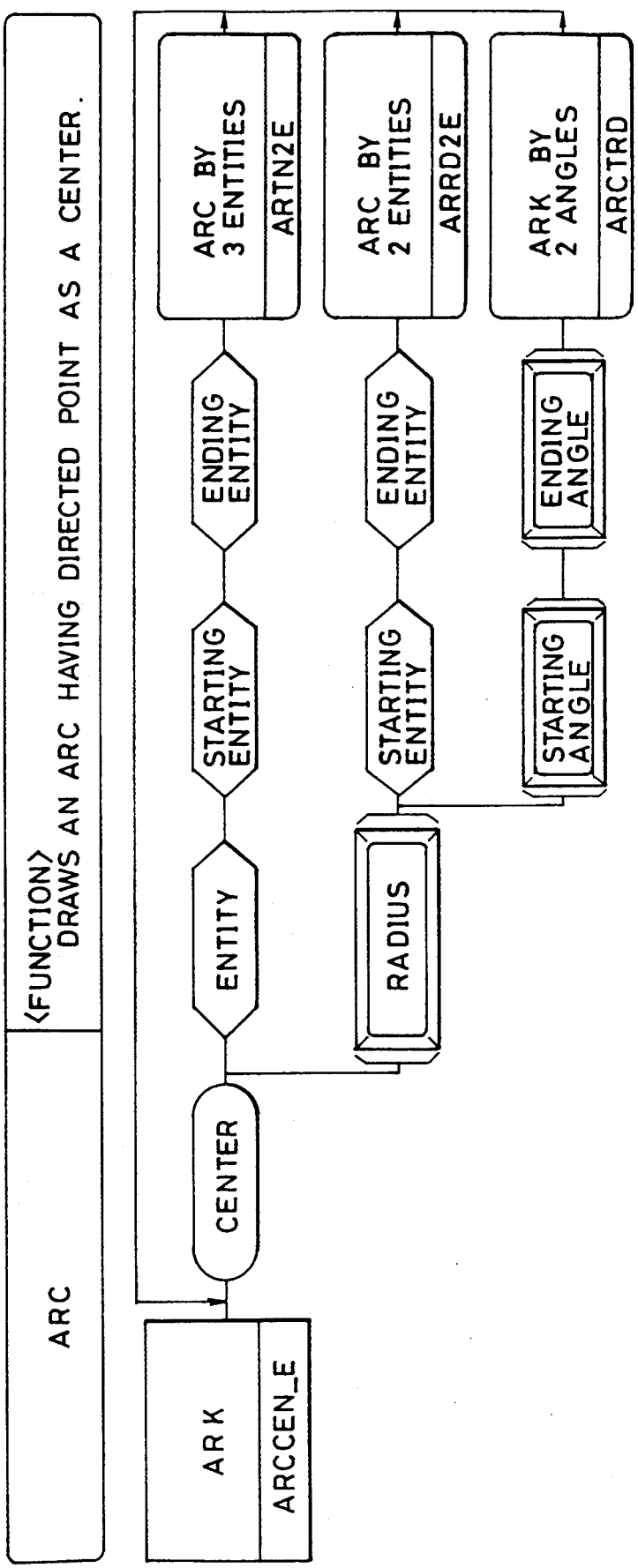
FIG. 55 is a flow chart to show another integrated command.
Figure 56:
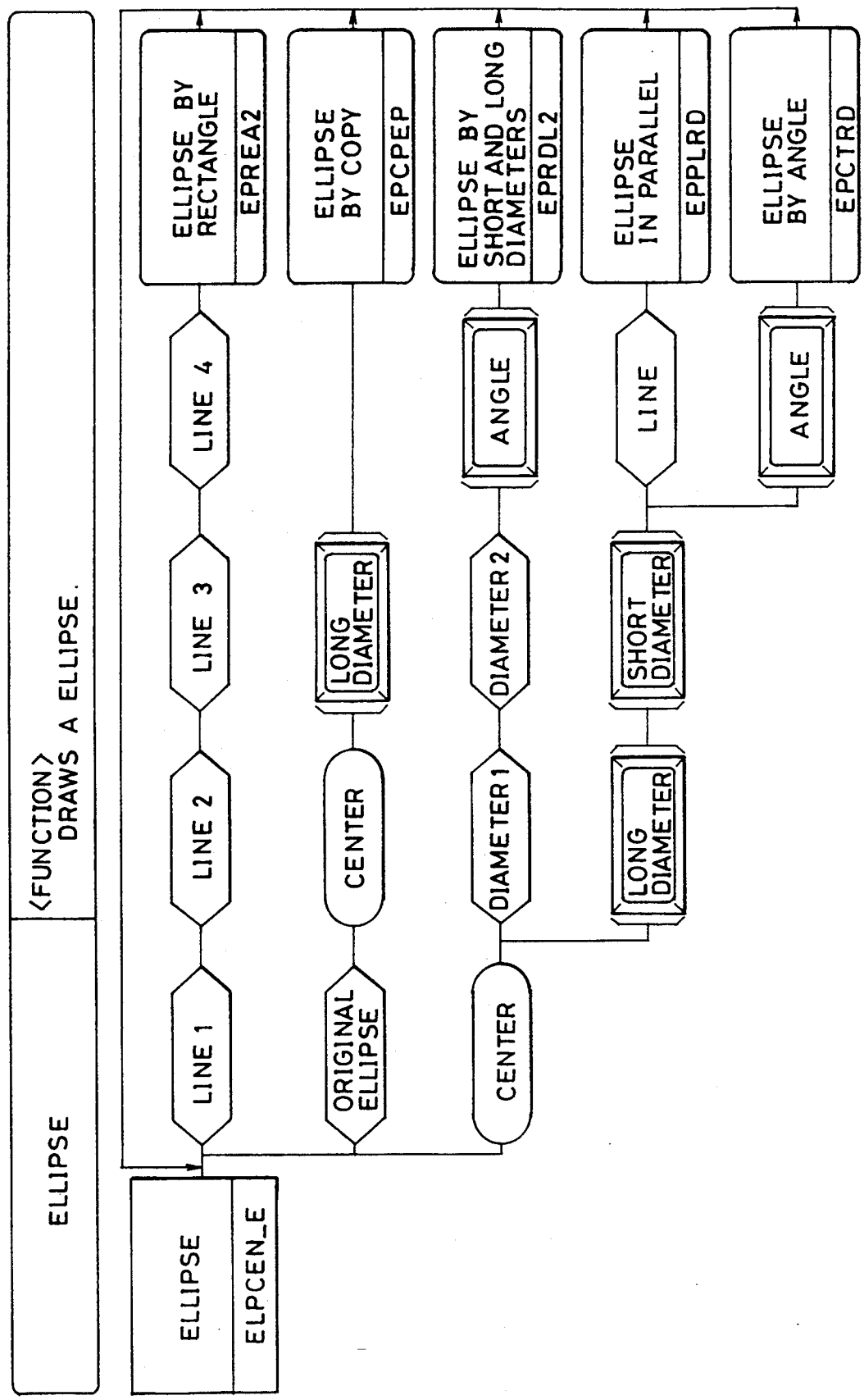
FIG. 56 is a flow chart to show another integrated command.
Figure 57:
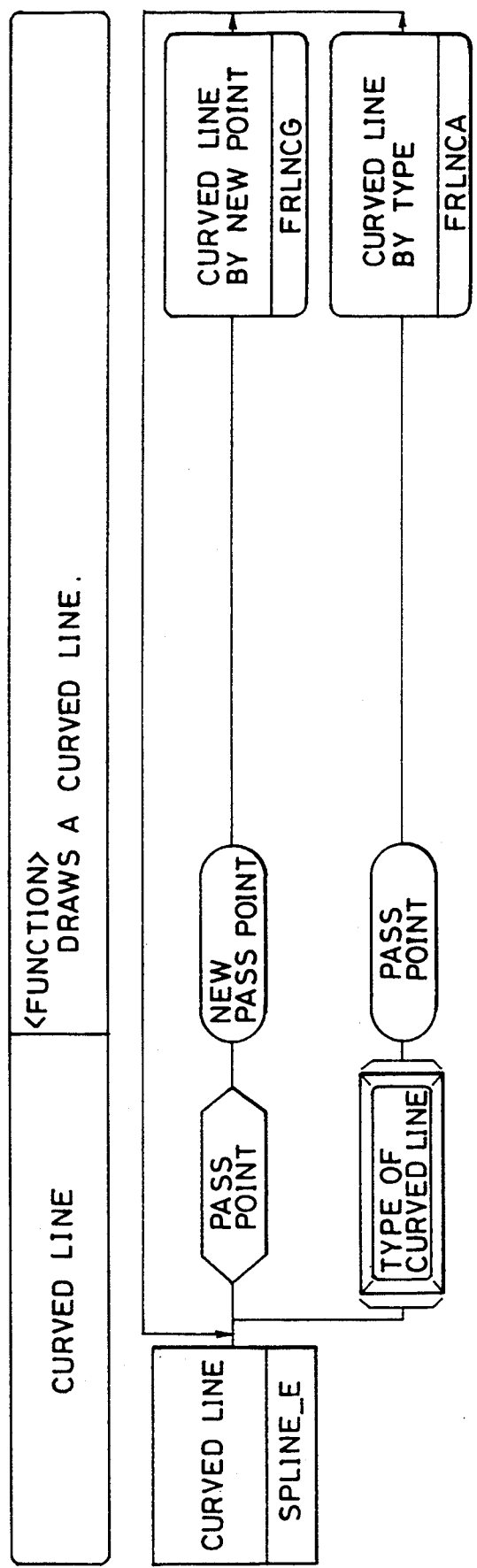
FIG. 57 is a flow chart to show another integrated command.
Figure 58:
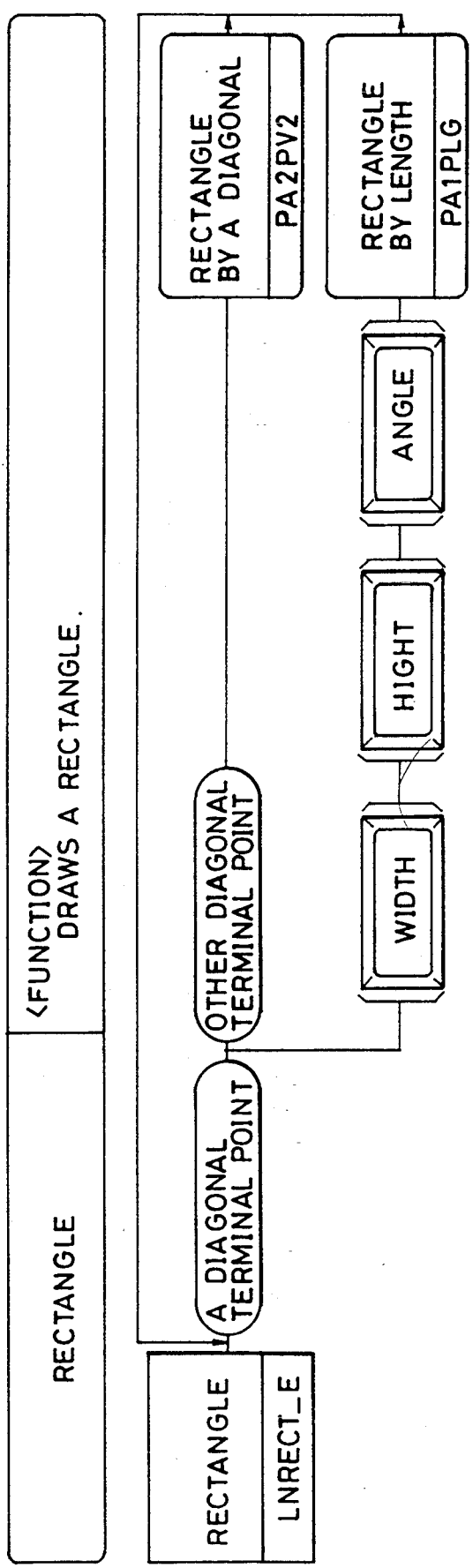
FIG. 58 is a flow chart to show another integrated command.

FIG. 39: A tangent circle is displayed as the next candidate. If the operator wants to confirm the displayed circle, indicate whether he exits from "tangent circle" command or continues to execute the next command.

FIG. 40 through FIG. 58 shows flow charts of other samples of the integrated commands. Symbols used in these figures are same as ones in FIG. 28. As the brief description is added to each flow chart, the operation flow of each integrated command are easily understood. Therefore the explanation is omitted here.

Embodiment 4

As has been described in the Embodiment 1, the guidances have priority from the left to the right in order. The priority of the guidance may depend on the order of basic commands defined in the integrated command definition file. However, it is possible that the highest priority may be given on the recently used basic command or the recently used parameter.

Embodiment 5

Embodiment 1 has not particularly described the case of the faulty designation of a parameter, for example, the faulty designation of the character string input parameter for the coordinates input parameter. The faulty designation of a parameter may be corrected by designating the predefined parameter correction procedure corresponding to each input mode.

Embodiment 6

As has been described, Embodiment 1 shows that the integrated command integrates basic commands only. But the integrated commands can further integrate the integrated command as follows;

integrated command name X; guidance X; integrated command name, basic command name, ...

Embodiment 7

As has been described, Embodiment 1 shows the case for generating the integrated command syntax file 4 by the integrated command registration utility to improve executing speed of the command.

It is also possible that the interactive command management module 5 refers directly to both the integrated command definition file 1 and basic command syntax file 2. As described the interactive command management module 5 recognizes one basic command from the integrated command referring to the integrated command syntax file 4, if the integrated command syntax file 4 exists. However, it is possible to design the apparatus so that the interactive command management module 5 uses the integrated command definition file 1 and basic command syntax file 2 to recognize a basic command from the integrated command if the integrated command syntax file 4 does not exist.

What is claimed is:

1. A command recognition apparatus comprising:

basic command syntax storage means for storing a plurality of basic commands and parameter information corresponding to a basic command syntax of each of said basic commands;

integrated command definition means for defining and storing an integrated command, the integrated command including a plurality of alternatively executable basic commands stored in said basic command syntax storage means;

integrated command syntax storage means for storing art integrated command syntax;

integrated command registration means for generating the integrated command syntax based on a definition of the integrated command memorized in said integrated command definition means referring to the basic command syntax stored in said basic command syntax storage means, and registering the syntax as the integrated command syntax in said integrated command syntax storage means;

input means for invoking the integrated command stored by said integrated command syntax means, entering parameters so that the invoked integrated command runs, and generating an order of parameter types; and recognition means for recognizing a basic command of said integrated command according to the order of parameter types, wherein said recognition means includes guidance display means for displaying a guidance showing the type of said parameters to be entered;

candidate selection means for checking the type of said parameter entered, and selecting at least one basic command as a candidate command by comparing the type of the parameter entered with the integrated command syntax stored by the integrated command syntax storage means;

confirmed execution means for executing a candidate command when there is only one candidate command;

temporary execution means for automatically temporarily executing a candidate command when said candidate selection means selects more than one candidate command; and repeat means for repeating operation of said guidance display means and temporary execution means until the candidate command is executed by said confirmed execution means.

2. A command recognition apparatus comprising:

integrated command syntax storage means for storing an integrated command, the integrated command including a plurality of alternative executable basic commands;

input means for invoking the integrated command stored by said integrated command syntax storage means, entering at least one parameter so that the invoked integrated command can be executed, and generating an order of parameter types; and recognition means for recognizing a basic command from the plurality of alternatively executable basic commands of the integrated command, according to the order of parameter types, wherein said recognition means includes guidance display means for displaying a guidance showing the type of the parameters to be entered;

candidate selection means for checking the type of the parameter entered, comparing the type of the parameter entered with a integrated command syntax stored by said integrated command syntax storage means, and selecting at least one basic command of the integrated command as a candidate command;

confirmed execution means for executing a candidate command when there is only one candidate command;

temporary execution means for automatically temporarily executing a candidate command when the candidate selection means selects more than one candidate command; and repeat means for repeating the operation of said guidance display means and temporary execution means until the candidate command is executed by the confirmed execution means.

3. The command recognition apparatus of claim 2, wherein the recognition means further includes default decision means for deciding the type of the parameter entered by the input means.

4. The command recognition apparatus of claim 3, wherein said default decision means includes means for identifying the type of parameter as one of a string, a numeric value, and a coordinate when the parameter is entered by a keyboard and/or a menu and as one of a drawing entity, and a coordinate when the parameter is entered by a mouse and/or a tablet.

5. The command recognition apparatus of claim 2, wherein said recognition means further comprises next candidate selection means for selecting and temporarily executing other candidate commands which are not executed by said temporary execution means.

6. The command recognition apparatus of claim 2, wherein said recognition means further comprises assignment means for explicitly assigning a type of the parameter to be entered by said input means.

7. The command recognition apparatus of claim 2, further comprising means for operating on a computer graphic system.

8. The command recognition apparatus of claim 2, further comprising means for operating on a computer system.

* * * * *